(12) United States Patent
Swager et al.

(10) Patent No.: US 10,719,755 B2
(45) Date of Patent: Jul. 21, 2020

(54) WIRELESS OXYGEN DOSIMETER

(71) Applicant: MASSACHUSETTS INSTITUTE OF TECHNOLOGY, Cambridge, MA (US)

(72) Inventors: Timothy Manning Swager, Newton, MA (US); Rong Zhu, Waltham, MA (US); Maude Desroches, Quebec (CA); Bora Yoon, Natick, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/942,418

(22) Filed: Mar. 30, 2018

(65) Prior Publication Data
US 2018/0285711 A1    Oct. 4, 2018

Related U.S. Application Data

(60) Provisional application No. 62/480,292, filed on Mar. 31, 2017.

(51) Int. Cl.
*G06K 19/077* (2006.01)
*G06K 19/07* (2006.01)
*G01N 27/12* (2006.01)

(52) U.S. Cl.
CPC ..... *G06K 19/07771* (2013.01); *G01N 27/127* (2013.01); *G06K 19/0723* (2013.01); *Y02P 70/521* (2015.11)

(58) Field of Classification Search
CPC .............................. G06K 19/07771

USPC .............................. 235/492; 340/10.4, 572.1
See application file for complete search history.

(56) References Cited

U.S. PATENT DOCUMENTS

| | | |
|---|---|---|
| 6,063,637 A | 5/2000 | Arnold |
| 7,985,868 B1 | 7/2011 | Bauer |
| 8,378,308 B2 | 2/2013 | Gerts |
| 8,426,208 B2 | 4/2013 | Swager |
| 9,563,833 B2 | 2/2017 | Swager |
| 2004/0186220 A1 | 9/2004 | Smalley |
| 2012/0091354 A1 | 4/2012 | Gerts |
| 2012/0295360 A1 | 11/2012 | Swager |
| 2015/0116093 A1 | 4/2015 | Swager |

OTHER PUBLICATIONS

Written Opinion for PCT/US2018/25587 dated Aug. 2, 2018.
International Search Report for PCT/US2018/25587 dated Aug. 2, 2018.

(Continued)

*Primary Examiner* — Allyson N Trail
(74) *Attorney, Agent, or Firm* — Steptoe & Johnson LLP

(57) ABSTRACT

A tag for detecting an analyte can include a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, wherein the sensor portion includes a conductive material associated with a polymer complex.

36 Claims, 24 Drawing Sheets

(56) References Cited

OTHER PUBLICATIONS

Yoon, et al. "Surface-Anchored Poly(4-vinylpyridine)-Single-Walled Carbon Nanotube-Metal composites for Gas Detection," Chem, Mater. 2016. vol. 28, pp. 5916-5924.

Wikipedia "Electrical Resistivity and Conductivity" Dec. 30, 2016 (Dec. 30, 2016) p. 1 para[0002]. Retrieved From https:/len.wikipedia.org/w/index.php?title=Electrical_resistivity_and_conductivity&oldid=757420332 on Jun. 1, 2018 (Jun. 1, 2018).

WIRELESS OXYGEN DOSIMETER

CLAIM OF PRIORITY

This application claims priority to U.S. Patent Application No. 62/480,292, filed Mar. 31, 2017, which is incorporated by reference in its entirety.

STATEMENT REGARDING FEDERALLY SPONSORED RESEARCH OR DEVELOPMENT

This invention was made with Government support under Contract No. DE-AC52-07NA27344 awarded by the Department of Energy and under Grant No. DMR-1410718 awarded by the National Science Foundation. The Government has certain rights in the invention.

TECHNICAL FIELD

This invention relates to wireless sensing.

BACKGROUND

Chemical sensors offer opportunities for improving personal security, safety, and health. To enable broad adoption of chemical sensors requires performance and cost advantages that are best realized from innovations in the design of the sensing (transduction) materials. Ideal materials are sensitive and selective to specific chemicals or chemical classes and provide a signal that is readily interfaced with portable electronic devices. Traditional solutions suffer from limitations, such as being expensive, bulky, or fragile, or requiring of trained personnel to operate. In addition, many traditional methods of sensing require physical contact of the device with the sensing element/material via wires or solid-state circuitry to acquire data.

Food and drug safety are recognized as a global priority that need emerging technologies to improve. The implement of new sensing technologies for monitoring the quality of food and drugs along the supply chain has the prospects to create improvements. See, Yam, K. L.; Lee, D. S. *Emerging Food Packaging Technologies: Principles and Practice*; Woodhead Publishing: 2012, and Akala, E. O. *Effect of Packaging on Stability of Drugs and Drug Products*, in *Pharmaceutical Manufacturing Handbook: Regulations and Quality* (ed S. C. Gad); John Wiley & Sons, Inc.: 2008, each of which is incorporated by reference in its entirety. This need is especially acute for perishable products such as fruit, meat, wine, as well as air- and/or moisture-sensitive pharmaceuticals.

SUMMARY

A tag for detecting an analyte can include a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, where the sensor portion includes a conductive material associated with a polymer complex.

In certain embodiments, the conductive material can include a carbon nanotube.

In certain embodiments, the polymer complex can include a polymer and a metal ion.

In certain embodiments, the polymer can include pyridine moieties.

In certain embodiments, the polymer can include poly(4-vinylpyridine) (P4VP).

In certain embodiments, the polymer can bind a metal ion.

In certain embodiments, the metal ion can be reduced upon interaction with the analyte.

In certain embodiments, the metal ion can be oxidized upon interaction with the analyte.

In certain embodiments, the metal ion can be $Cu^{2+}$, $Cu^+$, $Co^{3+}$, $Co^{2+}$, $Mn^{2+}$, $Pd^{2+}$, $Ru^+$, $Rh^{3+}$, $Ag^+$, $Cd^{2+}$, $Fe^{2+}$, $Ru^{3+}$, $Os^+$, $Ir^{3+}$, $Pt^{4+}$, $Pt^{2+}$, $Au^{3+}$, $Au^+$, $Hg^{2+}$, $Hg^+$ or $Tl^+$.

In certain embodiments, the metal ion can be $Fe^{2+}$.

In certain embodiments, the carbon nanotube can include a single-walled carbon nanotube.

In certain embodiments, the conductive material can include graphene.

In certain embodiments, the conductive material can include metal oxides.

In certain embodiments, the conductive material can include a metal-organic-framework.

In certain embodiments, the analyte can be oxygen.

In certain embodiments, each of the plurality of the carbon nanotubes can be wrapped by the polymer.

In certain embodiments, the radio frequency identification tag can be a near-field communication tag.

In certain embodiments, the tag can be incorporated into a badge capable of being worn by a person.

A system for detecting an analyte can include a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, wherein the sensor portion includes a conductive material associated with a polymer complex; and a detector.

In certain embodiments, the conductive material can include a carbon nanotube.

In certain embodiments, the polymer complex can include a polymer and a metal ion.

In certain embodiments, the polymer can include pyridine moieties.

In certain embodiments, the polymer can include poly(4-vinylpyridine) (P4VP).

In certain embodiments, the polymer can bind a metal ion.

In certain embodiments, the metal ion can be $Fe^{2+}$.

In certain embodiments, the analyte can be oxygen.

In certain embodiments, the detector can be a reader.

In certain embodiments, the reader can be a hand held reader.

In certain embodiments, a hand held reader can be a smartphone.

In certain embodiments, the tag can become readable from unreadable to the detector after the conductivity changes.

In certain embodiments, the tag can become unreadable from readable to the detector after the conductivity changes.

In certain embodiments, the system can include a dosimeter.

In certain embodiments, the dosimeter can be a radiation dosimeter, a chemical warfare agent dosimeter, a volatile organic compound dosimeter, or an analyte dosimeter.

In certain embodiments, the system can monitor a pollutant, a chemical relevant to occupational safety, a nerve agent, or a pulmonary agent.

In certain embodiments, the system can include a plurality of tags.

In certain embodiments, each of the plurality of tags can be capable of detecting at least one analyte.

A method of detecting an analyte can include detecting an output from a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, wherein the sensor portion includes a conductive material associated with a polymer complex.

In certain embodiments, the conductive material can include a carbon nanotube.

In certain embodiments, the polymer complex can include a polymer and a metal ion.

In certain embodiments, the polymer can include pyridine moieties.

In certain embodiments, the polymer can include poly(4-vinylpyridine) (P4VP).

In certain embodiments, the polymer can bind a metal ion.

In certain embodiments, the metal ion can be $Fe^{2+}$.

In certain embodiments, the analyte can be oxygen.

In certain embodiments, the method can further include detecting the output of the radio frequency identification by a reader.

In certain embodiments, the reader can include a handheld, mobile platform, or stationary reader.

In certain embodiments, the reader can include a smartphone.

In certain embodiments, the output can be detectable by a reader after the output is shifted by detection of the analyte.

In certain embodiments, the output can be detectable by a reader after the output going through a physical object.

In certain embodiments, the analyte can contact or interact with a portion of the surface of the radio frequency identification tag.

In certain embodiments, the sensor portion can be located on a portion of a surface of the radio frequency identification tag.

In certain embodiments, the sensor portion can be surrounded by an antenna coil.

In certain embodiments, the sensor portion can have a surface area less than the surface area of the radio frequency identification tag.

In certain embodiments, the radio frequency identification tag may not require a power source.

In certain embodiments, the method can further include altering an electrical connection within the radio frequency identification tag.

In certain embodiments, the sensor portion can include multiple sensing locations.

A method of making a tag can include making a dispersion a conductive material associated with a polymer complex and a solvent and drop-casting the dispersion on a substrate.

In certain embodiments, the conductive material can include a carbon nanotube.

In certain embodiments, the polymer complex can include a polymer and a metal ion.

In certain embodiments, the polymer can include pyridine moieties.

In certain embodiments, the polymer can include poly(4-vinylpyridine) (P4VP).

In certain embodiments, the polymer can bind a metal ion.

In certain embodiments, the metal ion can be $Fe^{2+}$.

In certain embodiments, the analyte can be oxygen.

Other aspects, embodiments, and features will be apparent from the following description, the drawings, and the claims.

BRIEF DESCRIPTION OF THE DRAWINGS

FIG. 9A shows the package. FIG. 9B shows the device's gain plot over time.

FIG. 10A shows UV-Vis-NIR absorption spectrum and a photo of the poly(4-vinylpyridine)-single-walled carbon nanotube (P4VP-SWCNT) composite dispersion. FIG. 10B shows schematic illustration of the fabrication process of the surface-anchored P4VP-SWCNT-FeII chemiresistor on glass substrates.

FIG. 13A shows triplicate SWCNT-P4VP-$Fe^{II}$ devices that were fabricated under air atmosphere instead under $N_2$ atmosphere. FIG. 13B shows triplicate SWCNT-P4VP-$Co^{II}$ devices. c) Quadruplicate SWCNT-P4VP-$Mn^{II}$ devices.

FIG. 14A shows original plots. FIG. 14B shows baseline corrected plots.

FIG. 19A shows photos of the package from the front and back. FIG. 19B shows the device's gain plot over time. The device was read by a smartphone in situ at t=0 and around 45 h (hollow circles). Inset: zoom in of the plot from 0 to 3 h. The hatched circle indicates the time at which the package was cut open to air (26% R. H.). FIG. 19C shows reflection spectra at t=0 and around 45 h.

DETAILED DESCRIPTION

Figure 1:
FIG. 1 shows the design concept of a small and battery-free near-field communication (NFC) sensor that measures oxygen exposure from inside a sealed package.

Development of portable and low-cost technologies for chemical and physical sensing is important for human health, safety, and quality of life. Such systems can be used for point-of-care diagnosis of disease, detection of explosives and chemical warfare agents, prevention of spoilage of food and increasing efficiency in agriculture, analysis of oil and gas, detection of petrochemical leaks and spills, monitoring of environmental pollution, detection of radiation, and monitoring of temperature or heat energy exposure. Traditional improvements in this area increase performance through modification or re-engineering of existing platforms. Such strategies may include miniaturizing components to increase portability (e.g., portable gas chromatograph or mass spectrometer) or reducing cost (e.g., increasing the efficiency of the manufacturing). While these solutions may improve existing platforms in terms of portability, they still suffer from limitations, such as being expensive, bulky, or fragile, or requiring of trained personnel to operate. Furthermore, many traditional methods of chemical sensing require physical contact of the device with the sensing element/material via wires or solid-state circuitry to acquire data.

Low cost and portable chemical sensors facilitate personal monitoring and sharing information of hazardous chemical substances (e.g., toxic gases, explosives, and carcinogens), which are of increasing interest for security, occupational safety, and health. See, Taylor, R. F.; Schultz, J. S. *Handbook of Chemical and Biological Sensors* (IOP Publishing, 1996), and Korotcenkov, G. *Handbook of Gas Sensor Materials: Properties, Advantages and Shortcomings for Applications Volume 2: New Trends and Technologies* (Springer, 2007), each of which is incorporated by reference in its entirety. Chemiresistive sensors are attractive devices to realize distributed low cost sensors and operate on a simple variation of electrical conductivity of sensing materials in response to analytes of interest. See Neri, G. *Chemosensors* 2015, 3, 1-20, which is incorporated by reference in its entirety. The direct electrical nature of the transduction in these devices is ideal for integration into omnipresent electronic devices. Various types of conductive materials (e.g., carbon, metal oxides, and metal-organic-frameworks) can be employed in chemiresistive sensors. See, Neri, G. *Chemosensors* 2015, 3, 1-20, and Campbell; M. G., Sheberla, D.; Liu, S. F.; Swager, T. M.; Dinča, M. *Angew. Chem. Int. Ed.* 2015, 54, 4349-4352, each of which is incorporated by reference in its entirety. Semiconductive single walled carbon nanotubes (SWCNT) are particularly interesting as a result of their high chemical and thermal stability, relatively small responses to humidity, and compatibility with solvent-mediated processes. See, Kauffman, D. R.; Star, A. *Angew. Chem. Int. Ed.* 2008, 47, 6550-6570, Snow, E. S.; Perkins, F. K.; Robinson, J. A. *Chem. Soc. Rev.* 2006, 35, 790-798, Schnorr, J. M.; Swager, T. M. *Chem. Mater.* 2011, 23, 646-657, and Fennell, J. F., Jr.; Liu, S. F.; Azzarelli, J. M.; Weis, J. G.; Rochat, S.; Mirica, K. A.; Ravnsbæk, J. B.; Swager, T. M. *Angew. Chem. Int. Ed.* 2016, 55, 1266-1281, each of which is incorporated by reference in its entirety. SWCNTs do not possess intrinsic selectivity for specific target analyte molecules and hence a major element of creating useful sensors from these materials involves functionalization with chemical units that enable selective responses to molecules or classes of reactive compounds. Chemical selectivity is commonly imparted upon SWCNTs by covalent attachment of selectors or receptors, resulting in robust chemiresistor stability. However, reactive functionalization of graphene surfaces disrupts the π-system, thereby negatively impacting sensitivity by limiting the dynamic range of the resisitivity. Conversely, non-covalent functionalization methods are less perturbative to the π-electronic structure of SWCNTs. See Fujigaya, T.; Nakashima, N. *Sci. Tech. Adv. Mater.* 2015, 16, 024802, which is incorporated by reference in its entirety. Modification of SWCNTs ideally enhance a chemiresistive responses (defined as $(G_1-G_0)/G_0 \times 100(\%)$, where $G_0$ and $G_1$ are initial and measured conductance) to target analytes relative to other chemicals in the surroundings. A central goal is to develop methods that increase chemiresistive responses to target analytes relative background noise, and this need is particularly important when the target analytes are toxic at trace (parts per million or lower) concentrations. See Romano, J. A., Jr.; Lukey, B. J.; Salem, H. *Chemical Warfare Agents: Chemistry, Pharmacology, Toxicology, and Therapeutics, Second Edition* (CRC Press, 2007), which is incorporated by reference in its entirety.

The cumulative exposure of toxic chemicals at trace concentrations is often of interest, and chemical dosimeters offer an important means for quantifying these events. Physical dosimeters from multi-walled carbon nanotubes wrapped with insulating poly(olefin sulfone)s display large increases in conductivity (ca. 10,000%) by radiation-induced degradation of the resistive polymer wrapper to create direct MWCNT-MWCNT contacts. See, Lobez, J. M.; Swager, T. M. *Angew. Chem. Int. Ed.* 2010, 49, 95-98, which is incorporated by reference in its entirety. In this case, evaporation of degradation products of poly(olefin sulfone)s (as $SO_2$ and olefin) is critical for promoting direct MWCNT-MWCNT contacts. Although a limited number of synthetic polymers produce volatile degradation products, this concept has the potential for general utility to create chemiresistive dosimeters.

Examples of Some Sensors

One method of detecting an analyte in a sample includes a carbon-carbon multiple bond moiety comprising exposing a detection region of a detector including a heteroaromatic compound having an extrudable group and capable of undergoing Diels-Alder reaction with the analyte including a carbon-carbon multiple bond moiety to the sample, and detecting color change of a reaction mixture comprising the heteroaromatic compound based on the presence of the analyte in the sample. This method provides alkene and alkyne detection, differentiation, and quantitation that addresses the growing need of transducing relevant information (only previously attainable from sophisticated methods such as GC-analysis) with the favorable low-cost and ease-of-use attributes ascribed to more basic technologies. Using this method, a device can indicate the presence of specific classes of alkenes or alkynes in the gas phase, and can determine the total exposure of the device to said alkenes or alkynes, based on a colorimetric readout. Because this device is selective for certain classes of alkenes and alkynes, it allows for differentiation of compounds of interest that contain certain alkene or alkyne functionality. This method can make use of the color change that accompanies the transformation of an s-tetrazine moiety to a pyrimidine moiety upon reaction with unsaturated carbon-carbon bonds. See, for example, Application No. PCT/US2014/033037, which is incorporated by reference in its entirety.

Another method of detecting a stimulus includes using a dosimeter, such as a thermal dosimeter, which can measure the amount of light emitted from a crystal in a detector when the crystal is heated. A dosimeter can use a triazole as described by Coulembier. See, for example, O. Coulembier et al., *Macromolecules,* 2006, 39, 5617-5628, which is incorporated by reference in its entirety.

Sensors Using a Digital Reader

Sensing platforms that have the characteristics of being simple, inexpensive, yet sensitive and quantitative can be created. One approach to the area of chemical and physical sensing can be the development of sensing materials and devices that have the characteristics of being modular (i.e., easily modified for specific applications), wirelessly readable, and easily used and interpreted by individuals with no prior technical training.

Whitesides and co-workers have demonstrated chemical detection of analytes in biologically-relevant samples using smartphones. See, for example, Martinez, A. W. et al., *Anal. Chem.,* 2008, 80, 3699-3707, which is incorporated by reference in its entirety. These methods involve capturing an image of a colorimetric assay using an in-phone camera and analyzing it to correlate changes in color of a dye with the presence of biologically relevant analyte. This method, however, requires line-of-sight measurement that can be affected by potential artifacts arising from lighting conditions, positional angle, or hand-movement during image acquisition.

Potyrailo et al. and others demonstrated electronic wireless detection of chemical analytes using RFID technology. See, for example, Potyrailo, R. A. et al., *Anal. Chem.* 2006, 79, 45-51, which is incorporated by reference in its entirety. While this technology has the capability to perform non-line-of sight measurements that overcome some of the limitations of the colorimetric assays, they have limited portability as they require the use of advanced electronics devices, such as inductively coupled network analyzers or impedance spectrometers.

Studies have exploited custom-made, as well as commercially available RFID tags to monitor freshness of milk, freshness of fish, and growth of bacteria. See, for example, Tao, H. et al., *Adv. Mater.* 2012, 24, 1067-72; Potyrailo, R. A. et al., Battery-free Radio Frequency Identification (RFID) Sensors for Food Quality and Safety, 2012, each of which is incorporated by reference in its entirety. These studies relied primarily on correlating the changes in dielectric environment of the RFID tags (i.e., changes in C) with changes in the resonant frequency or resonant impedance of the LCR circuit. However, they are limited by a lack of selectivity toward chemical analytes and physical stimuli, and by the requirement for expensive radio frequency analysis equipment such as impedance and network analyzers for chemical detection.

Although RF technology has been recently applied towards wireless chemical sensing, current approaches have several limitations including lack of specificity to selected chemical analytes, requirements for expensive, bulky, fragile, and operationally complex impedance and network analyzers, and reliance on extensive data processing and analysis. See, Potyrailo R A, Surman C, Nagraj N, Burns A (2011) Materials and transducers toward selective wireless gas sensing. *Chem Rev* 111:7315-7354, Lee H et al. (2011) Carbon-nanotube loaded antenna-based ammonia gas sensor. *Microw Theory Tech IEEE Trans* 59:2665-2673, Potyrailo R A et al. (2009) Development of radio-frequency identification sensors based on organic electronic sensing materials for selective detection of toxic vapors. *J Appl Phys* 106:124902, Fiddes L K, Yan N (2013) RFID tags for wireless electrochemical detection of volatile chemicals. *Sensors Actuators B Chem* 186:817-823, Fiddes L K, Chang J, Yan N (2014) Electrochemical detection of biogenic amines during food spoilage using an integrated sensing RFID tag. *Sensors Actuators B Chem* 202:1298-1304, Occhiuzzi C, Rida a., Marrocco G, Tentzeris M M (2011) Passive ammonia sensor: RFID tag integrating carbon nanotubes. 2011 *IEEE Int Symp Antennas Propag:* 1413-1416, each of which is incorporated by reference in its entirety.

A commercially available technology—Near Field Communication (NFC)—can be used for wireless, non-line-of-sight chemical sensing. Many modern smartphones and similar devices (tablet computers, video game controllers, and smartphone accessories) can be equipped with NFC readers operating at peak frequency of 13.56 MHz. These readers can be tuned to interact with many types of commercially available wireless "tags"—simple electrical circuits comprising an inductor (L), a capacitor (C), and an integrated circuit (resistor (R)) supported on the surface of a substrate, such as a polymeric sheet. The phone can achieve communication by powering the tag via electromagnetic induction at the specified frequency and then receiving reflected attenuated signal back from the tag. See, for example, Curty, J. P. et al., *Springer,* New York, 2007, pp. 49-73, which is incorporated by reference in its entirety. This technology can be used in controlling access to facilities, ticketing of events, prevention of theft, and management of inventory. This technology can be applied to chemical sensing by introducing chemiresistive materials into the circuitry of the tag. Exposure of the modified tag to chemical vapors can alter the resistance of the sensing materials, and thus the resonant frequency of the modified tag, such that it becomes readable or unreadable when probed by a smartphone reader. With this method, vapors of nitric acid, ammonium hydroxide and cyclohexanone, can be detected. This technology can be extended to physical sensors as well, such as applications in temperature, heat energy exposure or radiation sensing.

Commercially available RFID tags can be combined with a digital reader, such as a hand held frequency reader, for example a consumer electronic smartphone, resulting in a fully integrated chemical and physical sensing platform. The sensing platform can be available to anyone, including those without a technical background. This platform has advantages over existing methods of chemical and physical sensing. For example, the sensing method can be non-line-of-sight (high frequency radio waves), and can receive information from the sensor tag through solid objects such as packages, walls, wood, and other non-metallic objects. The sensing tag does not require a power source, as it receives its power from the incoming radio waves. The data-acquiring device can be any commercially available smartphone equipped with near field communication (NFC) reader capabilities, including but not limited to Samsung, LG, Google, Blackberry, etc. manufacturers. The method is simple: no technical knowledge is required to perform a measurement.

The chemical detection can be achieved using NFC technology instead of impedance spectroscopy and the detector can be a highly portable device such as a smartphone, instead of a very bulky complex instrument (e.g., a network analyzer). Besides portability, the smartphone has additional utility in chemical detection because the information obtained from the chemical sensor can be coupled with other sensors within the smartphone (e.g., GPS, email) for automated identification of position and communication of information. Ability for wireless chemical sensing over distance of 5 cm of solid material was demonstrated, as opposed to through a distance of a single paper sheet. This method incorporates chemiresistors into the existing circuitry of a tag by drawing as opposed to depositing sensing materials on top of the antenna. This method requires no data workup for signal processing, while existing methods often require substantial amount of data processing for interpreting information. This method does not require additional equipment for reading the magnetic memory. This method relies on changes on resistance of a selective chemiresistive or physiresistive material for chemical sensing, while existing methods rely on non-specific changes in capacitance. This method relies on molecular recognition for selectivity, and does not require principal component analysis, and so on.

A nascent technology can be embedded in modern smartphones—Near Field Communication (NFC)—for wireless electronic, portable, non-line-of-sight selective detection of gas-phase chemicals. NFC-enabled smartphones communicate with NFC tags by simultaneously energizing the NFC tag with an alternating magnetic field (e.g. f=13.56 MHz) through inductive coupling and transferring data by signal modulation. NFC tags are converted into Chemically Actuated Resonant Devices (CARDs) by disrupting the LCR circuit (Step 1) and recompleting the circuit with a stimuli-responsive variable circuit component by drawing (Step 2) with solid sensing materials.

This concept can be demonstrated by (i) incorporating carbon-based chemiresponsive materials into the electronic circuitry of commercial NFC tags by mechanical drawing, and (ii) using an NFC-enabled smartphone to relay information regarding the chemical environment (e.g., presence or absence of a chemical) surrounding the NFC tag. In this way, part-per-million (ppm) concentrations of ammonia and cyclohexanone and part-per-thousand (ppth) concentrations of hydrogen peroxide can be detected and differentiated. Wireless acquisition and transduction of chemical information can be coupled with existing smartphone functions (e.g., GPS).

Figure 18A:
FIG. 18A shows experimental setup for wireless sensing under an active flow of elevated humidity.
Figure 18B:
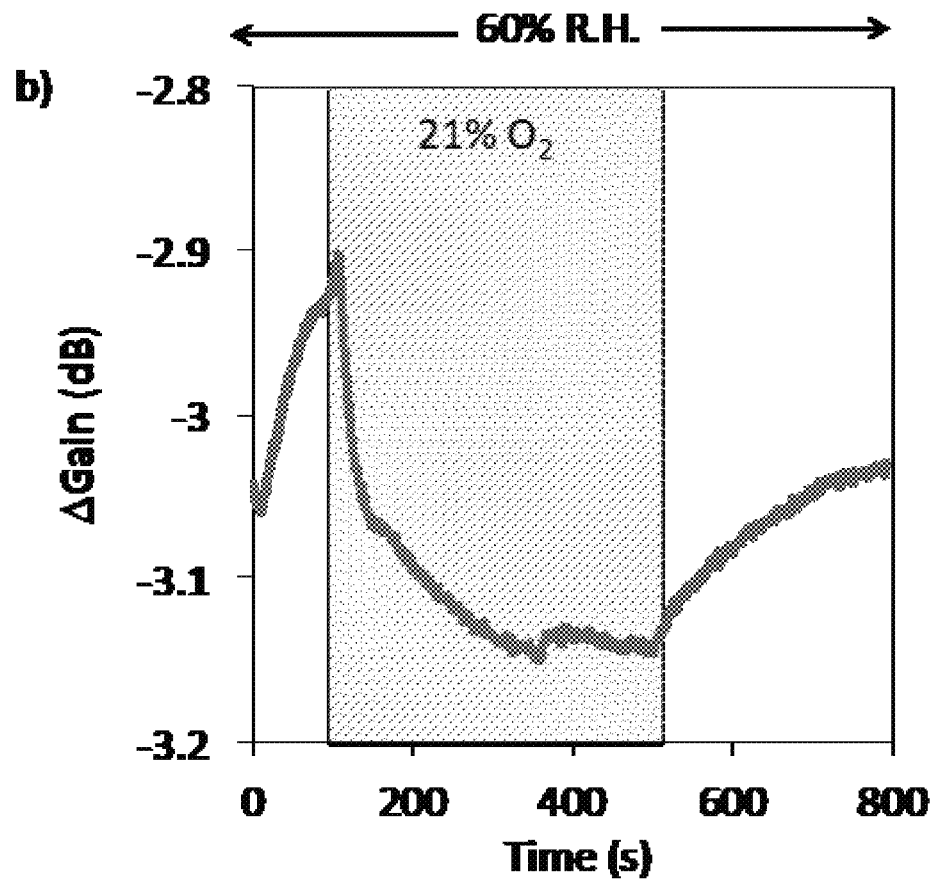
FIG. 18B shows wireless oxygen sensing trace of an original $O_2$-p-CARD in response to 21% (v/v) $O_2$ in $N_2$ at 60% relative humidity. Flow rate=0.5 L/min. The shaded bar indicates oxygen exposure.
Figure 18C:
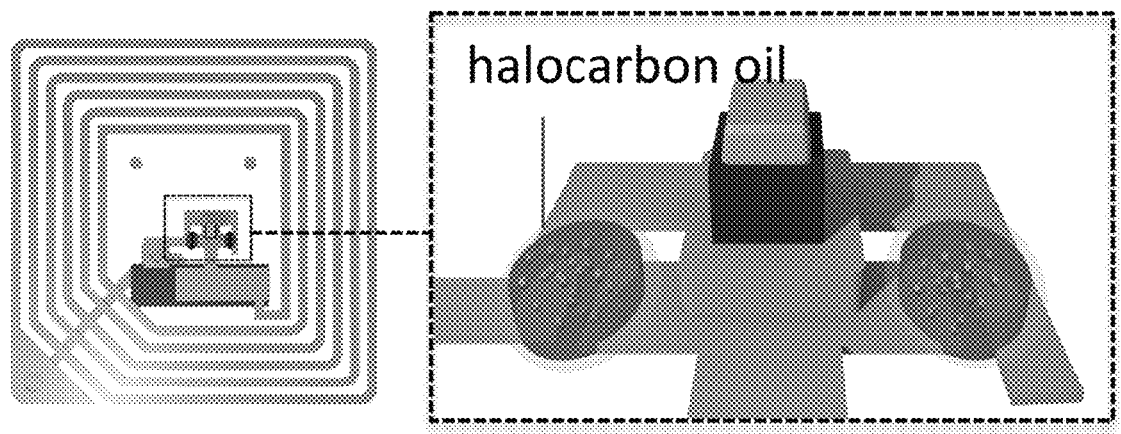
FIG. 18C shows a device in which halocarbon oil was introduced into the original $O_2$-p-CARD for minimizing baseline drifting under these conditions.

Many commercial smartphones and mobile devices are equipped with NFC hardware configured to communicate wirelessly with NFC "tags"—simple electrical resonant circuits comprising inductive (L), capacitive (C), and resistive (R) elements on a plastic substrate (FIGS. 18A-18C). The smartphone, such as the Samsung Galaxy S4 (SGS4), employed in this study, communicates with the battery-free tag by powering its integrated circuit (IC) via inductive coupling at 13.56 MHz. See, Nitkin P V., Rao K V S, Lazar S (2007) An overview of near field UHF RFID. 2007 *IEEE Int Conf RFID:*167-174, which is incorporated by reference in its entirety. Power transferred from the smartphone to the IC is, among other variables, a function of the transmission frequency (f), the resonant frequency ($f_o$), the quality factor (Q), and the circuit efficiency ($\eta$), which in turn are functions of L (H), C (F), and R ($\Omega$) of the smartphone and NFC resonant circuit components. See, Jing H C, Wang Y E (2008) Capacity performance of an inductively coupled near field communication system. 2008 *IEEE Antennas Propag Soc Int Symp* 2:1-4, which is incorporated by reference in its entirety. Integration of chemiresponsive materials into commercial NFC tags produces stimuli-responsive variable circuit components that affect power transfer between the tag and a smartphone in the presence or absence of chemical stimuli. The resulting programmable Chemically Actuated Resonant Devices (CARDs) enable non-line-of-sight smartphone chemical sensing by disrupting or allowing RF communication.

In one method, commercially available high frequency (HF) radio frequency identification tags compatible with a reader can be converted into chemical and physical sensors. The reader can be a digital reader, which can be a handheld frequency reader. The reader can be portable. The reader can be a smartphone. In parallel with the sensing capability, a smartphone reader can read other things, such as GPS coordinates, acceleration, light intensity, altitude, etc. Coupling these capabilities in one portable reader can have unprecedented utility.

This technology can be extended to temperature, heat energy exposure and radiation sensing as well. The modification of the tag can involve integration of chemiresistive sensing materials by drawing or dropcasting onto the surface of the tag. Depending on the design, the tag can become readable or unreadable when exposed to vapors of chemicals or physical stimulus.

A stimulus can include an analyte. The stimulus can include a vapor, a gas, a liquid, a solid, a temperature change, heat energy exposure and so on. The stimulus can include an ethylene, a mold, an acid, a ketone, a thiol, an amine, and so on. Using RFID, a stimulus can be detected; for example, vapors of nitric acid and cyclohexanone can be detected; and ethylene and mold can be detected; and biological warfare agents can be detected. Cumulative exposure of analytes can be detected and quantified with a dosimeter.

A stimulus can include a physical stimulus. The physical stimulus can include light, heat, or radiation. Using RFID, a stimulus can be detected for example, exposure of a tag to heat can be detected; and radiation and light can be detected. Cumulative exposure of physical stimulus can be detected and quantified with an RFID dosimeter.

A sensing material can produce detectable change in resistance and/or capacitance upon chemical, biological, or physical changes around the sensing device. A property of a sensing material that can change upon exposure to the environment includes, but is not limited to, change in capacitance, change in resistance, change in thickness, change in viscoelasticity, or a combination thereof.

A sensing material can include a metal, an organic material, a dielectric material, a semiconductor material, a polymeric material, a biological material, a nanowire, a semiconducting nanoparticle, a carbon nanotube, a carbon nanotube network, a nanofiber, a carbon fiber, a carbon particle, carbon paste, or conducting ink, or combination thereof.

Different approaches can be taken to introduce chemical and physical sensing materials. For example, sensing materials can be introduced into two different locations within a commercial RFID tags. Sensing materials include variable resistors that alter their resistance in response to a stimulus. A stimulus can be a chemical stimulus, a physical stimulus, a biological stimulus, etc. The detection of a stimulus can be achieved by switching the tag between a "readable" and "not readable" state, by exposure to a stimulus, such as chemical vapors or changes in temperature or heat energy exposure, for example.

When a stimulus contacts or interacts with a sensor, the resistivity can change. The contact or interaction can produce a readable signal in a hand held frequency reader as a result of the resistivity change. Alternatively, the contact or interaction can turn off a readable signal in a hand held frequency reader as a result of the resistivity change. Output can be detected after the output is shifted by detection of the stimulus. Even after going through a physical object, the output can still be detected. Detecting the stimulus is not limited to the frequency output, but can include, but is not limited to, a change in frequency, a change in q factor, a change in bandwidth, and a combination of these. These changes can result in increasing or decreasing the power transferred between the reader and radio frequency identification tag. Increasing or decreasing the power transferred between the reader and radio frequency identification tag can result in a change of the readout of the tag.

In one approach, a specific electric connection within an RFID tag can be disrupted, for example by cutting, and this connection can be reestablished by deposition of a chemiresistive sensing material by either drawing or dropcasting. An RFID tag can include an integrated circuit (IC) containing magnetic memory material where the tag identification is stored. Depending on the sensing material and the stimulus, the tag can become readable and is classified as a "turn ON sensor," or become unreadable and is classified as a "turn OFF sensor".

In one method, the tag is not readable by a reader when no stimulus is present, because the resistance of the sensor is too high. When the tag is placed in the presence of a stimulus that causes the sensor to change its resistance, the tag can become readable once the resistance value crosses a threshold value. This is a turn-on sensing method.

In another method, the tag can be readable by a reader when no analyte is present, because the resistance of the sensor is high enough to allow current to flow through the integrated circuit. When the tag is placed in the presence of a stimulus that causes the sensor to change its resistance, the tag can become unreadable once the resistance value drops below a certain threshold value. This is a turn-off sensing method.

In another method, instead of a turn-on sensing or a turn-off sensing, a series of data can be collected, which can provide a quantitative analysis of a stimulus.

In another method, parallel integration can be used to integrate a sensing material into a portion of the tag containing the integrated circuit by drawing or dropcasting. This approach can "turn ON" or "turn OFF" detection of a stimulus, and can be complimentary to the first approach because requirements for resistance of the deposited sensing material can be different (which may have an effect on the dynamic range and the detection limit of chemical sensors towards different analytes).

A radio frequency identification tag does not have to require a power source. RFID tags can be either passive, active or battery-assisted passive. An active tag has an on-board battery and periodically transmits its signal. A battery-assisted passive has a small battery on board and is activated when in the presence of a RFID reader. A passive tag has no battery.

When detecting a stimulus comprising detecting an output from a radio frequency identification tag including a sensor portion, the stimulus does not have to contact or interact with the entire surface of the tag. The sensor portion has a surface area less than the surface area of the radio frequency identification tag. The sensor portion can be located on a portion of a surface of the radio frequency identification tag, and the stimulus can contact a portion of the surface of the radio frequency identification tag. In addition, the sensor portion can have multiple sensing locations, and a single tag can be used to detect more than one stimulus.

A system for detecting a stimulus comprising a radio frequency identification tag can include a sensor portion, the sensor portion configured to change resistivity when the radio frequency identification tag contacts or interacts with the stimulus, whereby the resistivity change alters an output of the radio frequency identification tag, and a detector detecting the output from the radio frequency identification tag. The detector can include a reader. The reader can include a hand held frequency reader. A method of detecting a stimulus can include detecting an output from a radio frequency identification tag including a sensor portion.

The system can include a real time sensor. The system can include a dosimeter, such as a radiation dosimeter, a chemical warfare agent dosimeter, or an analyte dosimeter, such as, for example, an ethylene dosimeter, a sulfur dosimeter, or an ozone dosimeter. The system can be used to monitor pollutants or chemicals relevant to occupational safety. Pollutants or chemicals can include fumes from automotive/equipment exhaust, volatiles from manufacturing, painting, or cleaning, or vapors in underground mines.

A sensor can include an electronic circuit comprising electronic components. Electronic components can include resistors, transistors, capacitors, inductors and diodes, connected by conductive wires or traces through which electric current can flow. The electrical connection within the radio frequency identification tag can be altered. The resistivity of the sensor can change when the sensor is exposed to a stimulus. Contacting or interacting with a stimulus can close the circuit or open the circuit, or otherwise alter the properties of the circuit.

A sensor can include a sensing material such as a metal, an organic material, a dielectric material, a semiconductor material, a polymeric material, a biological material, a nanowire, a semiconducting nanoparticle, a carbon nanotube, a nanofiber, a carbon fiber, a carbon particle, carbon paste, or conducting ink, or combination thereof. A sensing material can include organic electronics materials, doped conjugated polymers, or inorganic materials. A sensing material can include biological molecule receptors, living cells, antibodies, aptamers, nucleic acids, functionalized biological molecules, or other bioligically relevant moieties.

A tag for detecting a stimulus comprising a radio frequency identification tag can include a sensor portion, the sensor portion configured to change resistivity when the radio frequency identification tag contacts or interacts with the stimulus, whereby the resistivity change alters an output of the radio frequency identification tag, wherein the sensor portion includes a circuit, and wherein the sensor portion is configured to close the circuit or open the circuit when contacted it having interacted with the stimulus. The tag can be worn as a badge for occupational health and safety personnel, military personnel, etc., detecting a hazardous analyte or radiation.

A tag can include a substrate material. The substrate can include paper, plastic, a polymer, a metal, a metal oxide, a dielectric material, wood, leaves, skin, tissue, and so on. The substrate can include a metal oxide material. The substrate can be flexible; the substrate can be flat. The tag can also be embedded inside other objects (e.g., inside a capsule or a wall) or inside living systems (e.g., implanted inside a body).

A tag can include an antenna, providing a link between a frequency reader and a tag, receiving and transmitting a signal, and serving as a conduit that moves data back and forth. The antenna can include coils surrounding a sensor; the antenna can include a dipole antenna. A tag can include an antenna group including a plurality of antennas or an antenna array.

The ability to easily detect the existence of an analyte on a base signal using an ON/OFF binary detection method is of increasing interest in today's society. A system using a portable reader, such as a smartphone, enables everyone to determine the status of certain analytes anywhere without complicated analysis of a signal. When the amount of an analyte changes, a handheld frequency reader can turn on or turn off a signal, sending a notification of the presence or absence of the analyte. Another advantage of using a smartphone is that it carries within it many additional capabilities that can be coupled with chemical sensing to increase utility. For instance, a smartphone reader can identify a chemical spill and immediately send an emergency text or email alert identifying position of a spill using GPS. Another example could be wireless networks that monitor spatiotemporal changes in concentrations of chemical emissions and send emergency alerts when safe thresholds are exceeded. Coupling of such capabilities can enable unprecedented utility of chemical sensors in everyday life.

A tag can serve as a binary logic element providing either a "1" or a "0" as pre-defined by functional sensor material, which offers advantages in terms of simplicity of implementation and does not require any sophistication by the end user. If viewed as a binary logic element, the tag could be used in further elaborations of that logic. For instance, a unique combination of the readout of multiple tags could be assigned to a specific meaning. For example, if three separate tags are "coded" for three separate analytes by virtue of the sensor materials used to make them, then $2^3$ possible combinations exist, which could each mean something unique and significant. For example, if those analytes were food related, then one could possibly determine which type of food the sensors are attached to based on a combination of tag read-out, within a certain probability. Another example would be three tags that are "coded" with the same sensor material that has been designed to react at different concentrations of analyte. The combination of tag readout would allow one to determine, within some margin of error, the concentration of the analyte of interest.

The binary on/off readability of CARDs by the smartphone can be a powerful approach for converting analog physical inputs (presence or absence of a chemical vapor within a defined threshold) into a digitized output (1 and 0, respectively) that conveys meaningful information about the local chemical environment of the CARDs. The advantage of a binary-readout is that it is the simplest possible output representation of input information, and hence allows modular multiplexing of different CARD combinations. This analytical approach has practical limitations in its implementation; however, it may be particularly useful in resource-constrained scenarios or high throughput applications where information about the presence or absence of specific chemicals at specified thresholds is critically important. Such applications may include detection of an acceptable threshold (e.g., permissible exposure limit for a chemical) that provides valuable actionable information in dynamic, complex environments (e.g., chemical release within a public space). Even under circumstances wherein the chemical of interest can be readily detected by the human nose, a differentiating feature of a smartphone-based sensing strategy over human-olfactory detection or visual inspection of a colorimetric test is the ability to efficiently bring sensed information into the information technology infrastructure.

An inexpensive, simple, rapid, and modular approach for converting commercially available NFC tags into chemically actuated devices can communicate with a smartphone via radio waves. This approach enables electronic wireless, non-line-of-sight detection and discrimination of gases and vapors at part-per-million and part-per-thousand concentrations. This technology provides binary ("on"/"off") information about the presence or absence of a chemical analyte regarding designated concentration thresholds, (e.g., NIOSH STEL) within the local environment of the sensor tag, and is capable of differentiating multiple concentrations of one analyte or multiple analytes using multi-tag logic. The general sensing strategy involving wireless communication between NFC tags and smartphones is modular and can be generalized to incorporate many types of chemiresponsive materials to enable selective detection of diverse chemical changes. Nevertheless, the significant challenges that remain to realize the full potential of this wireless sensing approach includes: (i) chemical and materials science innovations to improve the sensitivity and selectivity of chemiresponsive materials to chemical analytes; (ii) improving device-to-device performance reproducibility by advancing the state-of-the-art of nanostructured carbon deposition techniques and; (iii) enabling continuum measurement CARD readout capabilities. The combination of chemical sensing with other capabilities within the smartphone (e.g., GPS) may enable additional utility in applications involving tracking and tracing. As a result of the portability and increasingly ubiquitous use of smartphones and mobile devices, this platform can enable applications in personalized and widely distributed chemical sensing wherein the acquisition of chemical or physical information was previously unattainable.

Disclosed herein is a tag for detecting an analyte comprising a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, wherein the sensor portion includes a conductive material associated with a polymer complex.

In certain embodiments, the conductive material includes a carbon nanotube. In certain embodiments, the polymer complex includes a polymer and a metal ion. In certain embodiments, the polymer includes pyridine moieties In certain embodiments, the polymer includes poly(4-vinylpyridine) (P4VP).

In certain embodiments, the polymer binds a metal ion. In certain embodiments, detection of an analyte is via a change of in the redox status of the metal ion. The metal ion can be redox active. In certain embodiments, the metal ion can be oxidized by the analyte. In certain embodiments, the metal ion can be $Fe^{2+}$, and $Fe^{2+}$ can be oxidized to $Fe^{3+}$ by an oxidizing analyte. In certain embodiments, the analyte can be oxygen. In certain other embodiments, the metal ion can be reduced by an analyte. In certain embodiments, the metal ion can be $Cu^{2+}$, and $Cu^{2+}$ can be reduced to $Cu^{+}$ by a reducng analyte. In certain embodiments, the metal ion can be $Co^{3+}$, and $Cu^{3+}$ can be reduced to $Co^{2+}$ by a reducng analyte. In certain embodiments, the analyte can be NO gas, $H_2$ gas, or formic acid.

Oxygen causes food spoilage and drug degradation, which is addressed commercially by modified atmosphere packaging. In certain embodiments, a wireless oxygen sensor, $O_2$-p-CARD, can include solution processed $Fe^{II}$-poly (4-vinylpyridine)-single-walled carbon nanotube composite on commercial passive near-field communication tags. A large irreversible attenuation in the reflection signal of an $O_2$-p-CARD was observed in response to oxygen at relevant concentrations enabling non-line-of-sight monitoring of modified atmosphere packaging. These devices allow for cumulative oxygen exposure inside a package to be read with a conventional smartphone. An $O_2$-p-CARD can detect air ingress into a nitrogen-filled vegetable package at ambient conditions. This technology provides an inexpensive, heavy-metal-free, and smartphone-readable method for in situ non-line-of-sight quality monitoring of oxygen-sensitive packaged products. Sensors are printed onto commercial radio frequency identification systems, and this method can be readily implemented Most food spoilage is caused or enabled by oxygen. The presence of oxygen not only allos the growth of numerous aerobic microorganisms that pose a health threat, but also causes oxidative chemical reactions that degrade food quality, nutrition, and flavors. See, Brody, A. L.; Strupinsky B. R.; Kline, L. R. *Active Packaging for Food Applications*; Technomic Publishing Co.: 2001, which is incorporated by reference in its entirety. For drugs, both hydrolytic and aerobic degradation are common, and the later usually has a larger irreversible effect. See, Li, M. *Organic Chemistry of Drug Degradation* (No. 29); Royal Society of Chemistry: 2012, which is incorporated by reference in its entirety. The most common solution to extending the lifetime of these products is to use modified atmosphere packaging (MAP), wherein packages sealed in an inert gas (typically nitrogen, argon or carbon dioxide) atmosphere. See, Ahvenainen, R. *Novel Food Packaging Techniques*; Woodhead Publishing: 2003, Brown, M.; Leeson, L. J. *J. Pharm. Sci.* 1969, 58, 242-245, and Mahajan, R.; Templeton, A.; Harman, A.; Reed, R. A.; Chern, R. T. *Pharm. Res.* 2005, 22, 128-140,
each of which is incorporated by reference in its entirety. In this context, the oxygen level within the package can be used as an indicator for the package integrity and quality of the contents during the production, storage, distribution, and retail processes.

Sensors for packaging must be readily interrogated and above all inexpensive. A viable sensor for oxygen monitoring of individual packaging requires low-cost, battery-free sensors that can be easily integrated into the enclosure. See, Han, J. H. *Innovations in food packaging*; Academic Press: 2005, and Yam, K. L.; Takhistov, P. T.; Miltz, J. *J. Food Sci.* 2005, 70, R1-R1, each of which is incorporated by reference in its entitrety. Additionally, sensors exhibiting irreversible responses, properly called dosimeters, are generally most useful as they will report on the cumulative oxygen exposure. See, Ahvenainen, R. *Novel Food Packaging Techniques*; Woodhead Publishing: 2003, Brown, M.; Leeson, L. J. *J. Pharm. Sci.* 1969, 58, 242-245, Mahajan, R.; Templeton, A.; Harman, A.; Reed, R. A.; Chern, R. T. *Pharm. Res.* 2005, 22, 128-140, and Mills, A. *Chem. Soc. Rev.* 2005, 34, 1003-1011, each of which is incorporated by reference in its entirety. In particular, small leaks developed in a package can often temporally elevate the oxygen levels, but rapid microbial growth can consume the oxygen and a real-time oxygen sensor will thereby provide an inaccurate measurement of the damage to the content's packaging.

Current technologies for oxygen monitoring in packages rely on optical methods. Luminescence and colorimetric-based indicators have been developed based on oxygen induced redox reactions. See, Mills, A. *Chem. Soc. Rev.* 2005, 34, 1003-1011, Wang, X-D.; Wolfbeis, O. S. *Chem. Sac. Rev.* 2014, 43, 3666-3761, and Quaranta, M.; Borisov, S. M.; Klimant, I. *Bioanal. Rev.* 2012, 4, 115-157, each of which is incorporated by reference in its entirety. The integration of optical oxygen indicators, a digital color reporting system, and a LED light in an RFID tag has been reported. See, Martinez-Olmos, A.; Fernández-Salmerón, J.; Lopez-Ruiz, N.; Rivadeneyra Torres, A.; Capitan-Vallvey, L. F.; Palma, A. J. *Anal. Chem.* 2013, 85, 11098-11105, and Escobedo, P.; Erenas, M. M.; Lopez Ruiz, N.; Carvajal, M. A.; González Chocano, S.; de Orbe-Payá, I.; Capitan-Vallvey, L. F.; Palma, A. J.; Martínez Olmos, A. *Anal. Chem.* 2017, 89, 1697-1703, each of which is incorporated by reference in its entirety. Drawbacks associated with these technologies include: 1) the need for transparent packaging, line-of-sight access to the sensor, and the need for a light source; 2) expensive (spectroscopic) or low-throughput (visual inspection) measurements; 3) reversible (non-dosimetric) responses; and 4) the use of expensive heavy metals (Pd, Ru) or enzymes.

The limitations of present technologies for in situ package monitoring can be addressed using a chemiresistive wireless sensing platform recently introduced that leverages commercial passive radio frequency identification (RFID) technology (FIG. 1). An RF reader, in this case a smartphone, can remotely read the sensor's state, and access the quality of the package contents without a line of sight. See, Azzarelli, J. M.; Mirica, K. A.; Ravnsbæk, J. B.; Swager, T. M. *Proc. Nat. Acad. Sci.* 2014, 111, 18162-18166, and Zhu, R.; Azzarelli, J. M.; Swager, T. M. *Angew. Chem. Int. Ed.*, 2016, 55, 9662-9666, each of which is incorporated by reference in its entirety. For examples of RFID sensors in food-related applications, see Kumar, P.; Reinitz, H. W.; Simunovic, J.; Sandeep, K. P.; Franzon, P. D. *J. Food Sci.* 2009, 74, R101-R106, Potyrailo, R. A.; Surman, C.; Nagraj, N.; Burns, A. *Chem. Rev.* 2011, 111, 7315-7354, Potyrailo, R. A.; Nagraj, N.; Tang, Z.; Mondello, F. J.; Surman, C.; Morris, W.

Figure 2A:
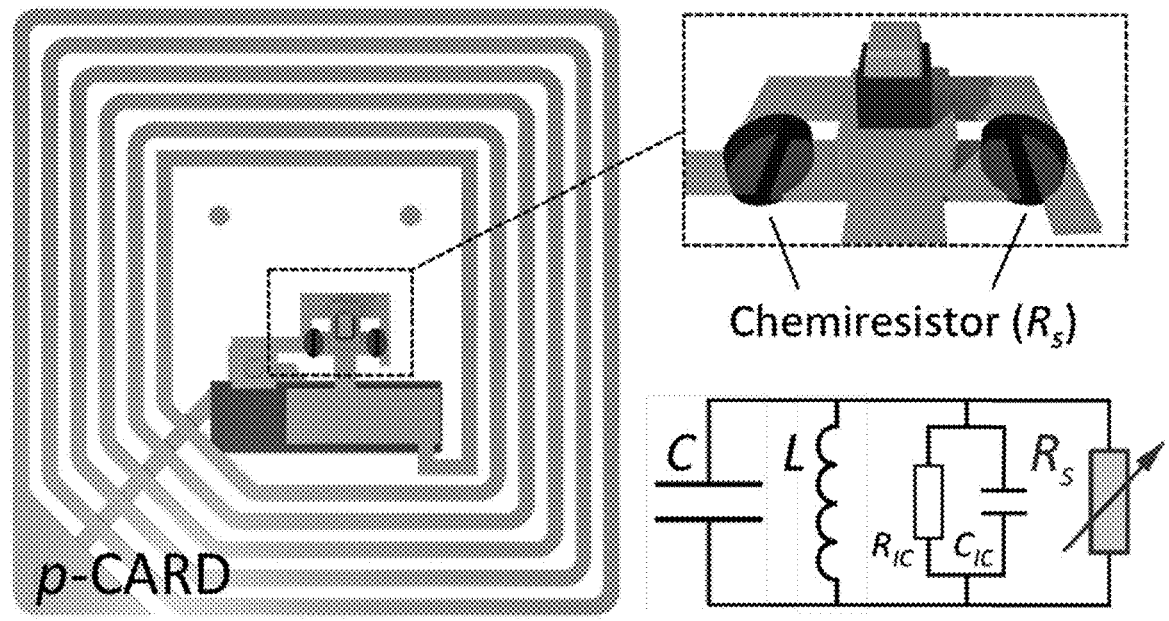
FIG. 2A shows conversion of a commercially available NFC tag into a wireless sensor (p-CARD) via deposition of chemiresistive material ($R_s$) at the indicated locations.

J. Agric. Food Chem. 2012, 60, 8535-8543, Jun, J.; Oh, J.; Shin, D. H.; Kim, S. G.; Lee, J. S.; Kim, W. Jang, J. ACS Appl. Mater. Interfaces 2016, 8, 33139-33147, Tanguy, N. R.; Fiddes, L. K.; Yan, N. ACS Appl. Mater. Interfaces 2015, 7, 11939-11947, Smits, E.; Schram, J.; Nagelkerke, M.; Kusters, R.; van Heck, G.; van Acht, V.; Gerlinck, G. in *Proceedings of the 14th International Meeting on Chemical Sensors, Nuremberg, Germany* 2012, 403-406, and Smolander, M.; Seppa, H.; Hurme, E.; Varpuna, T.; Saari, J. M.; Suni, I.; Sammi, J.; Majander, P. U.S. patent application Ser. No. 10/495,927, 2002, each of which is incorporated by reference in its entirety. This method can be implemented by simply placing a chemiresistive element into the resonant circuit of a commercially available near-field communication (NFC) tag, and the result is a chemically actuated resonant device (CARD) (FIG. 2A). The circuit diagram of p-CARD is shown in FIG. 2A. C: tuning capacitor; L: inductor (antenna); $R_{IC}$: resistance of integrated circuit (IC); $C_{IC}$: capacitance of IC; $R_s$: chemiresistor. The chemical information of a CARD's surrounding environment can be transduced by a simple RF reader, which is a standard feature in modern smartphones that have near field communication (NFC) capabilities. An important feature of the CARD is that it can be read through opaque non-conductive containers. The CARD's sensing data is naturally coupled with the ID information programmed into the integrated circuit of the NFC tag. Hence CARDs serve as intelligent labels that allow manufacturers, retailers or customers to simultaneously track the quality and historical data of the product using the existing RFID systems.

The chemiresistor designs achieve selective irreversible $O_2$ responses by merging single-walled carbon nanotube (SWCNT) network with an earth-abundant reducing metal ion that undergoes irreversible aerobic oxidation. Reducing metal ions deplete the hole carrier concentrations in SWCNTs, and with oxidation the higher-valent electrophilic metal ions increase the hole carrier density. This scheme is ideally paired with poly(4-vinylpyridine)-SWCNT (P4VP-SWCNT) composites recently reported for the following reasons. See, Yoon, B.; Liu, S. F.; Swager, T. M. *Chem. Mater.* 2016, 28, 5916-5924, which is incorporated by reference in its entirety. This method gives persistent dispersion of SWCNTs that have enhanced sensitivity, minimal baseline drift, and is compatible with inkjet printing and spray coating. See, Yang, L.; Zhang, R.; Staiculescu, D.; Wong, C. P.; Tentzeris, M. M. *IEEE Antenn. Wireless Propag. Lett.* 2009, 8, 653-656, which is incorporated by reference in its entirety. An additional and critical aspect is that the pyridine moieties in P4VP can bind and stabilize a broad spectrum of metal ions in intimate contact with the SWCNTs. The ability to position a metal ions in close proximity to the SWCNT walls ensures a strong response (high sensitivity) from oxygen induced changes, which in the present system involves changes in the ratio of $Fe^{II}$ to $Fe^{III}$.

SWCNTs can be functionalized covalently or non-covalently with other molecules in order to impart sensitivity or selectivity for a desired analyte. See, for example, K. A. Mirica, et al. *Angew. Chem.* 2012, 124, 10898-10903; K. A. Mirica, et al., *Angew. Chem. Int. Ed.* 2012, 51, 10740-10745; J. M. Schnorr, et al. *Chem. Mater.* 2011, 23, 646-657, each of which is incorporated by reference in its entirety. In particular, non-covalent functionalization allows for facile functionalization without disruption of the electronic properties of the CNTs that can accompany covalent functionalization. See, for example, W. Maser, et al., in Functionalized Nanoscale Materials, Devices and Systems (Eds.: A. Vaseashta, I. N. Mihailescu), Springer, Dordrecht, The Netherlands, 2008, pp. 101-120, which is incorporated by reference in its entirety.

Covalent functionalization is based on the formation of a covalent linkage between functional entities and the carbon skeleton of nanotubes. It could also be divided into direct covalent sidewall functionalization and indirect covalent functionalization with carboxylic groups on the surface of CNTs. Direct covalent sidewall functionalization is associated with a change in hybridization from $sp^2$ to $sp^3$ and a simultaneous loss of conjugation. Indirect covalent functionalization takes advantage of chemical transformations of carboxylic groups at the open ends and holes in the sidewalls. These carboxylic groups might have existed on the as-grown CNTs and also be further generated during oxidative purification. In order to increase the reactivity of CNTs, the carboxylic acid groups usually need to be converted into acid chloride and then undergo an esterification or amidation reaction. The drawback of covalent functionalization is that the structure of CNTs has to be destroyed, resulting in significant changes in their physical properties.

Non-covalent functionalization is mainly based on supramolecular complexation using various adsorption forces, such as van der Waals force, hydrogen bonds, electrostatic force and π-stacking interactions. Compared to the chemical functionalization, non-covalent functionalization has the advantages that it could be operated under relatively mild reaction conditions and the graphitic structure of CNTs could be maintained.

In certain embodiments, a sensor can include a composite of a polymer and SWCNTs immobilized onto a substrate. In certain embodiments, the substrate can include metal electrodes, and a linker can be grafted on the substrate. The linker can connect the substrate and the composite of the polymer and SWCNTs. In certain embodiments, the linker can covalently bond the polymer to the substrate. In certain embodiments, metal nanoparticles or ions can be further included as a metal sensitizer to confer further selectivity or sensitivity to the device. The metal nanoparticles or ions can be coordinated by residual moieties in the polymer that are not consumed by grafting to the substrate. In certain embodiments, the polymer can act as a ligand for a variety of metal ions. By incorporating a specific metal ion, the sensor can selectively detect an analyte.

The substrate can be either rigid or flexible. In certain embodiments, the substrate can be made of rigid materials, such as glass, plastic, wood, concrete, rocks, metal chalcogenides, rigid polymers and their composites, passivated metals, bone, asphalt, graphite, silicon, semiconductors, a resonant circuit, ceramics, marble, or granite. In certain embodiments, the substrate can be made of flexible materials, such as paper, polymers, skin, cloth, tissue, plants, leather, thin sheets of semiconductors or metals, and tires.

In certain embodiments, the electrodes can include gold or silver.

In certain embodiments, the linker can include an alkyl halide group. For example, the linker can be 3-bromopropyltrichlorosilane.

In certain embodiments, the metal nanoparticles can include silver, copper, gold, mercury, zinc, cobalt, rhodium, iridium, nickel, platinum, palladium, iron, ruthenium, manganese, tin, lead or oxides or sulfides thereof.

In certain embodiments, the metal ion can be $Cu^{2+}$, $Cu^+$, $Co^{3+}$, $Co^{2+}$, $Mn^{2+}$, $Pd^{2+}$, $Ru^+$, $Rh^{3+}$, $Ag^+$, $Cd^{2+}$, $Fe^{2+}$, $Ru^{3+}$, $Os^+$, $Ir^{3+}$, $Pt^{4+}$, $Pt^{2+}$, $Au^{3+}$, $Au^+$, $Hg^{2+}$, $Hg^+$ or $Tl^+$.

Figure 2B:
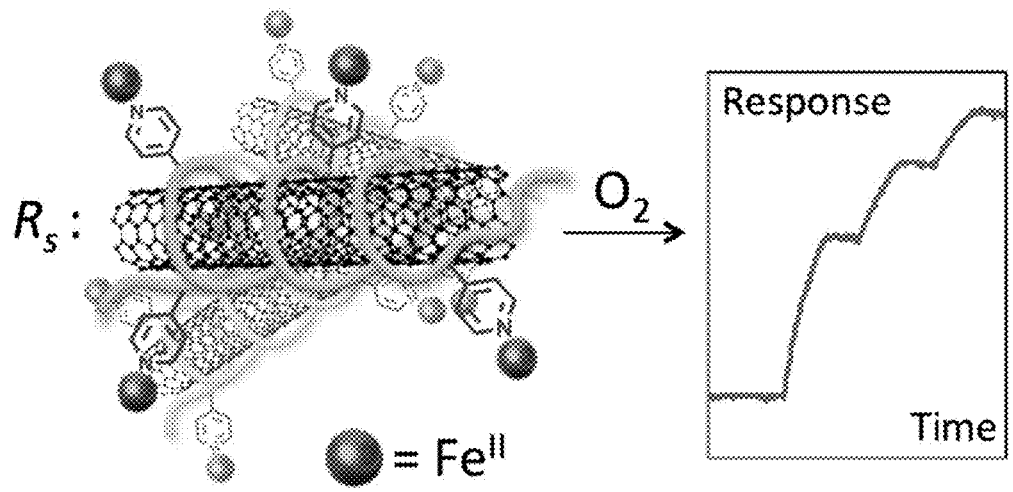
FIG. 2B shows poly(4-vinylpyridine) disperses single-walled carbon nanotubes and coordinates to Fe(II) ions.

In certain embodiments, a battery-free wireless device affords a tunable dosimetric response to oxygen exposure via the aerobic oxidation of $Fe^{II}$ (FIG. 2B) that can be readily implemented in a modified atmosphere packaging. This hybrid system is sensitive chemiresistor that displays irreversible (dosimetric) response to oxygen exposure to enable an $O_2$-p-CARD. Oxygen sensing is demonstrated by immobilization of the P4VP-SWCNT-$Fe^{II}$ chemiresistor on a glass surface. However the method is readily extended to wireless NFC ($O_2$-p-CARDs) that are smartphone compatible and detect oxygen at concentrations relevant to a modified atmosphere packaging. Finally, the performance of this device to ambient air ingress was assessed in a vegetable package.

The chemiresistor development leverages the recently reported P4VP-SWCNT platform that allows for covalent anchoring on a glass substrates. See, Yoon, B.; Liu, S. F.; Swager, T. M. *Chem. Mater.* 2016, 28, 5916-5924, which is incorporated by reference in its entirety. The immobilized films are modified by complexing of reduced metal ions for oxygen-reacting. An attractive feature of this platform is that it enables the incorporation of metal ions proximate to the graphene sidewalls without covalently modifying the SWCNTs. Although covalent methods may also be effective, this process in principle is less perturbative to the nanotube's transport properties.

In the choice of metal component, the rich aerobic oxidation chemistry of $Fe^{II}$ species was identified as being more environmental-benign and cost-efficient option than existing heavy metal-based methods. In fact, iron compounds are widely used as oxygen scavengers for packaging. See, Miltz, J.; Perry, M. *Packag. Technol. Sci.* 2005, 18, 21-27, which is incorporated by reference in its entirety. Thus targeted $Fe(MeCN)_6(BF_4)_2$ was targeted as the precursor for introducing $Fe^{II}$ into the P4VP-SWCNT network, with the expectation that the labile acetonitrile ligand will allow fast irreversible ligand exchange with the stronger pyridyl ligands or P4VP. See, McGhee, L.; Siddique, R. M.; Winfield, J. M. *J. Chem. Soc., Dalton Trans.* 1988, 1309-1314, which is incorporated by reference in its entirety. In addition, residual acetonitrile bound to $Fe^{II}$ will provide a dynamic ligand sphere that facilitates the reaction with oxygen.

Figure 3A:
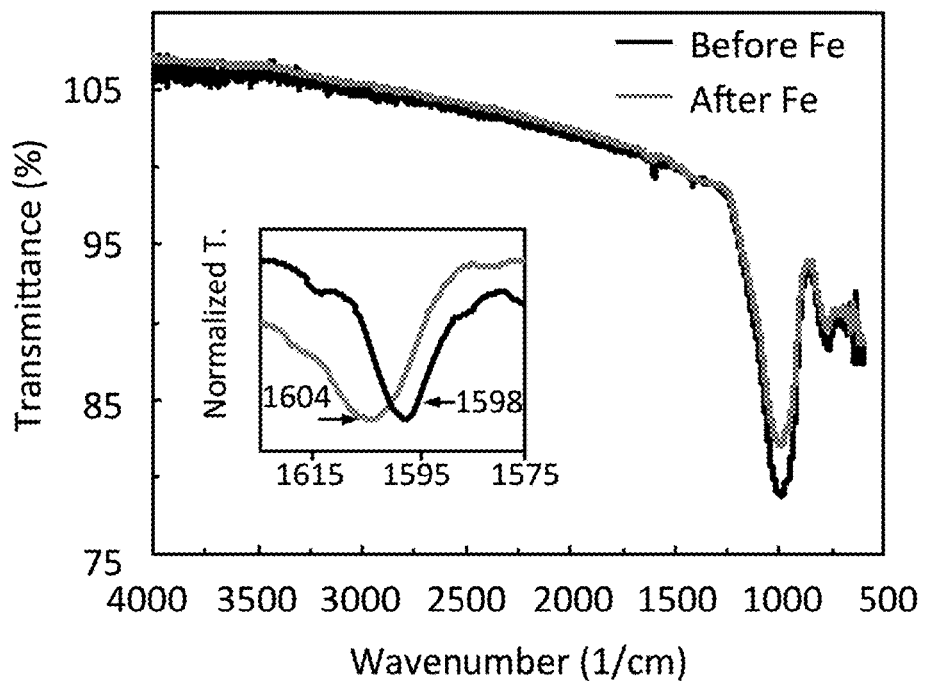
FIG. 3A shows ATR-FTIR spectra of P4VP-SWCNT composites on a glass substrate before (black plot) and after (blue plot) Fe incorporation.
Figure 3B:
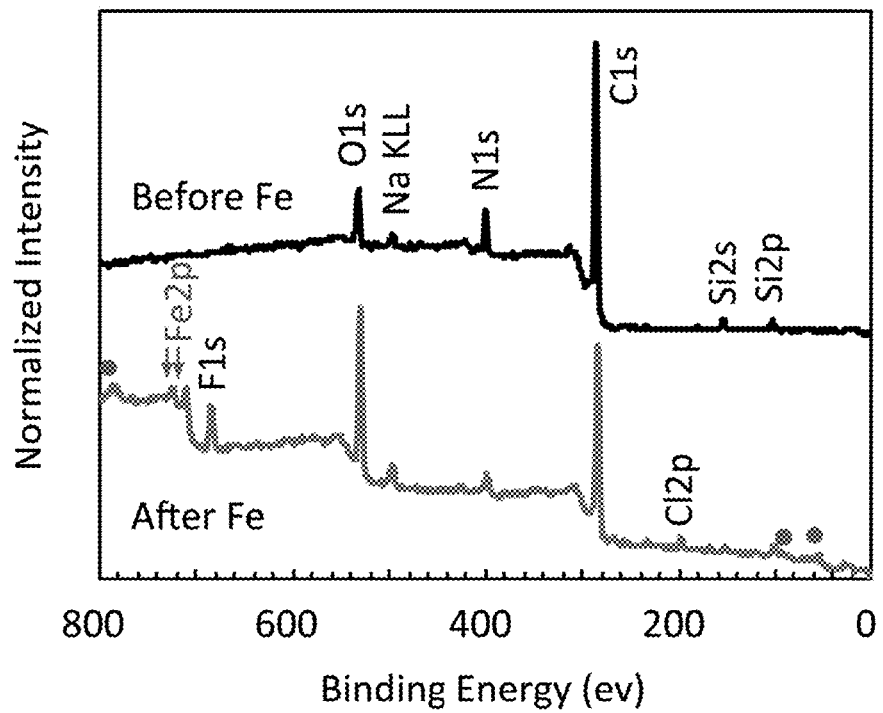
FIG. 3B shows XPS spectra of the pristine P4VP-SWCNT composite and Fe-incorporated P4VP-SWCNT composite immobilized on a glass substrate. Red dots display characteristic peaks for Fe.
Figure 10A:
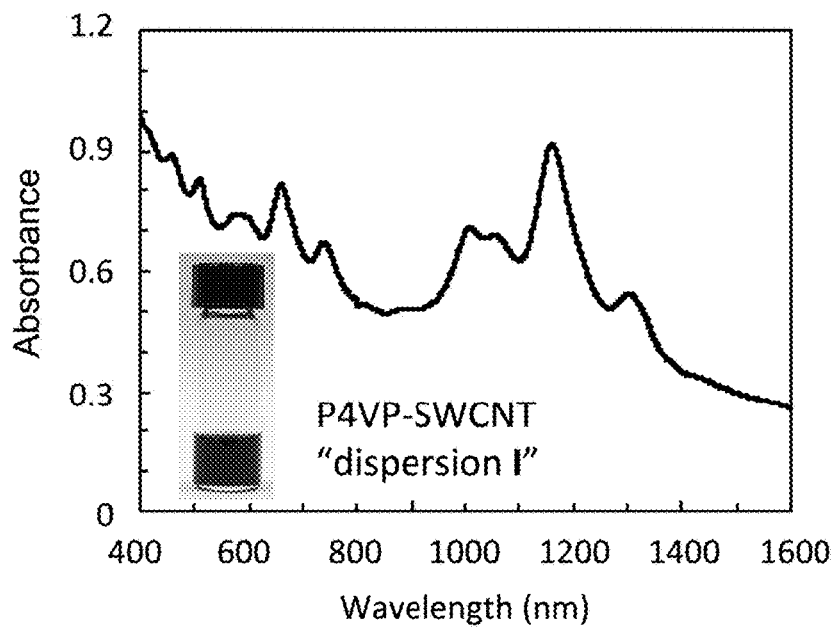
FIGS. 10A-10B show fabrication and evaluation of surface-immobilized sensors on glass substrates.
Figure 10B:
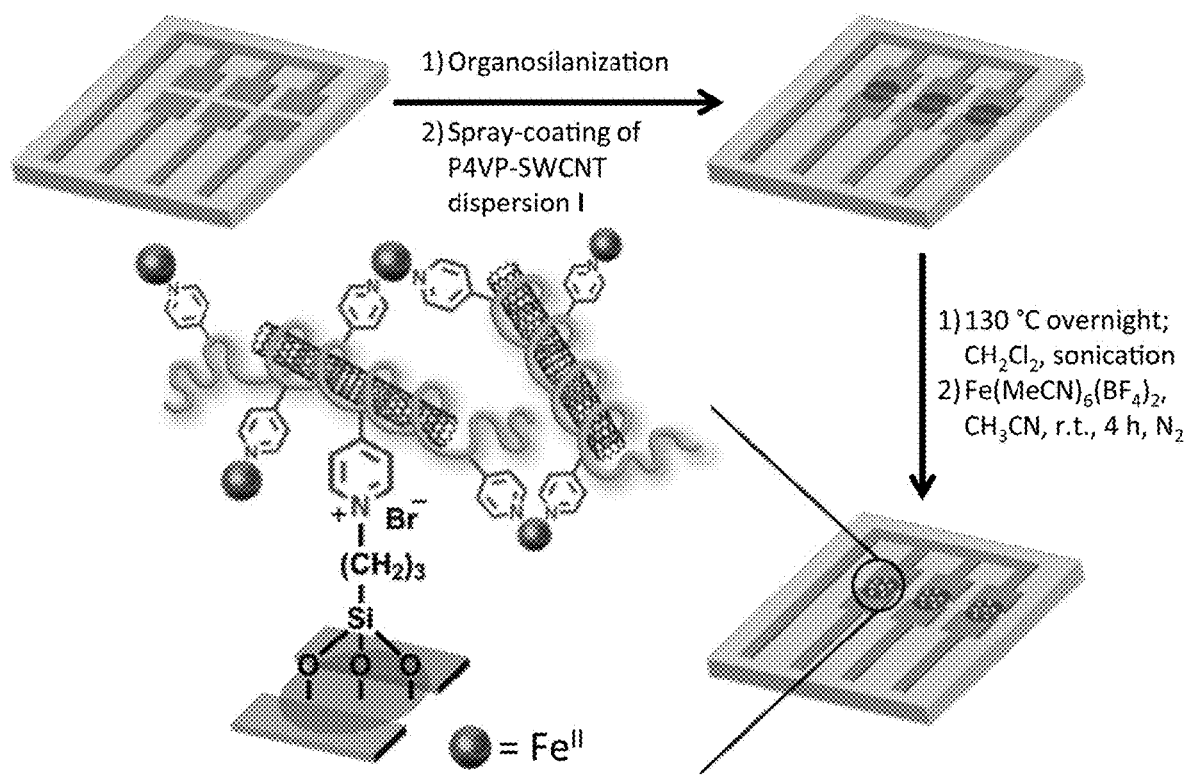
Figure 11:
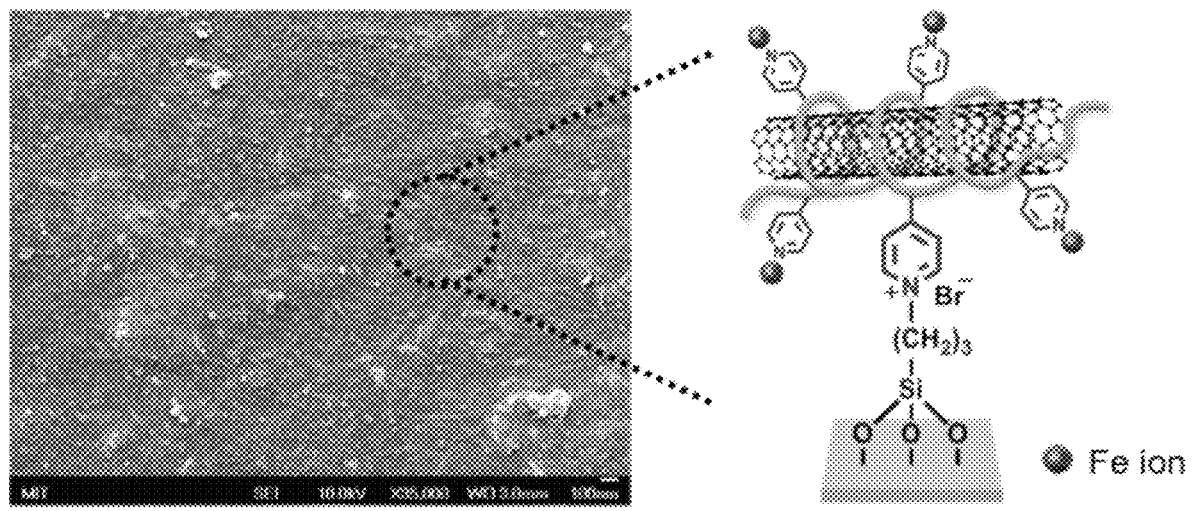
FIG. 11 shows scanning electron microscopy image of Fe-incorporated P4VP-SWCNT composites immobilized on a glass substrate and its schematic representation.

Following the outlined strategy, the surface-anchored P4VP-SWCNT composite was treated with $Fe(MeCN)_6(BF_4)_2$ for 4 h under nitrogen atmosphere before rinsing with solvents to remove the unbound iron species (FIGS. 10A-10B). Scanning electron microscopy imaging of the Fe-composite on glass confirmed the presence of a robust nanotube network after multistep manipulations (FIG. 11). FTIR spectrum of the Fe-composite revealed a small and reproducible shift to higher frequency of the P4VP pyridine centered stretching vibration bands (1604 cm$^{-1}$) as compared to that of the pristine P4VP-SWCNT composite (1598 cm$^{-1}$), which is consistent with bands observed in known $Fe^{II}$-pyridine complexes (1603 cm$^{-1}$) (FIG. 3A). See, McGhee, L.; Siddique, R. M.; Winfield, J. M. *J. Chem. Soc., Dalton Trans.* 1988, 1309-1314, which is incorporated by reference in its entirety. The incorporation of iron after treatment was further confirmed by X-ray photoelectron spectroscopic (FIG. 3B).

Figure 4A:
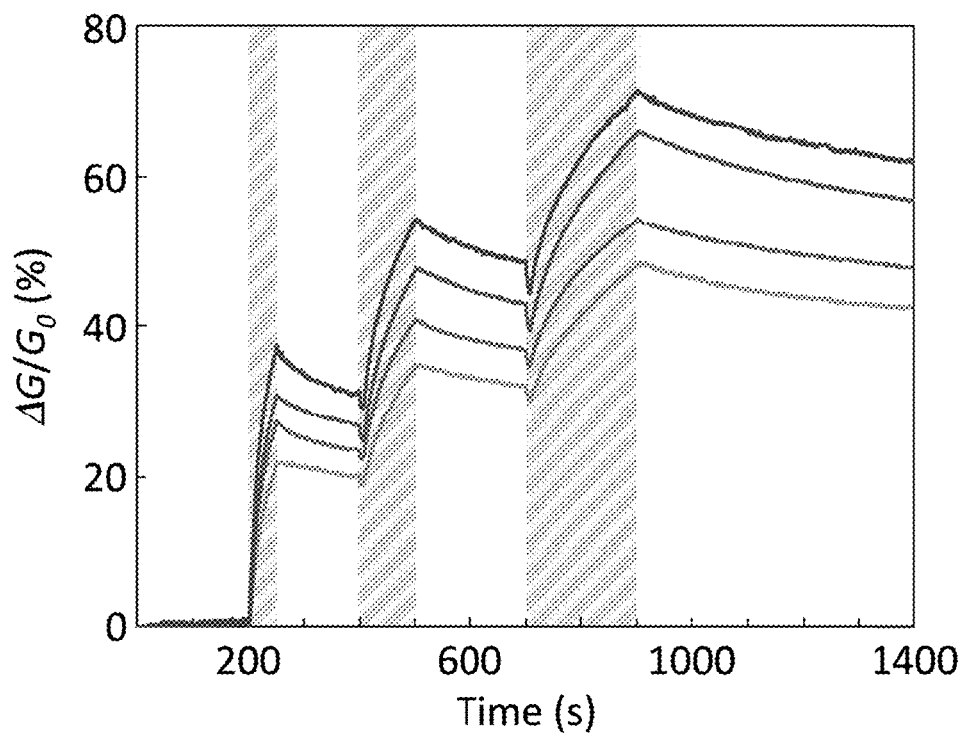
FIG. 4A shows chemiresistive traces of quadruplicate surface-immobilized SWCNT-P4VP-$Fe^{II}$ sensor devices in response to 18% $O_2$ in $N_2$ (v/v). Shaded areas indicate individual exposures. Flow rate=2 L/min.

With the $Fe^{II}$ incorporation confirmed, the response of the chemiresistor to oxygen exposure was tested (FIG. 4A). It was observed that the conductance of the surface-anchored P4VP-SWCNT-$Fe^{II}$ chemiresistor increased substantially (~30%) upon the first 50 s exposure to 18% oxygen diluted by nitrogen. In addition, this response was found to be largely irreversible (dosimetric). These observations are consistent with the hypothesis that P4VP bound $Fe^{II}$ species are quickly oxidized by oxygen irreversibly, generating $Fe^{III}$ species that withdraw charge from the SWCNTs and increase the hole carrier density and conductivity. Also, the response was attenuated after multiple exposures, which is attributed to the consumption of active $Fe^{II}$ species and/or the creation of stable mixed valence clusters. The irreversible nature of the response provides a good estimation of cumulative oxygen exposure as long as the initial conductance is known.

Figure 4B:
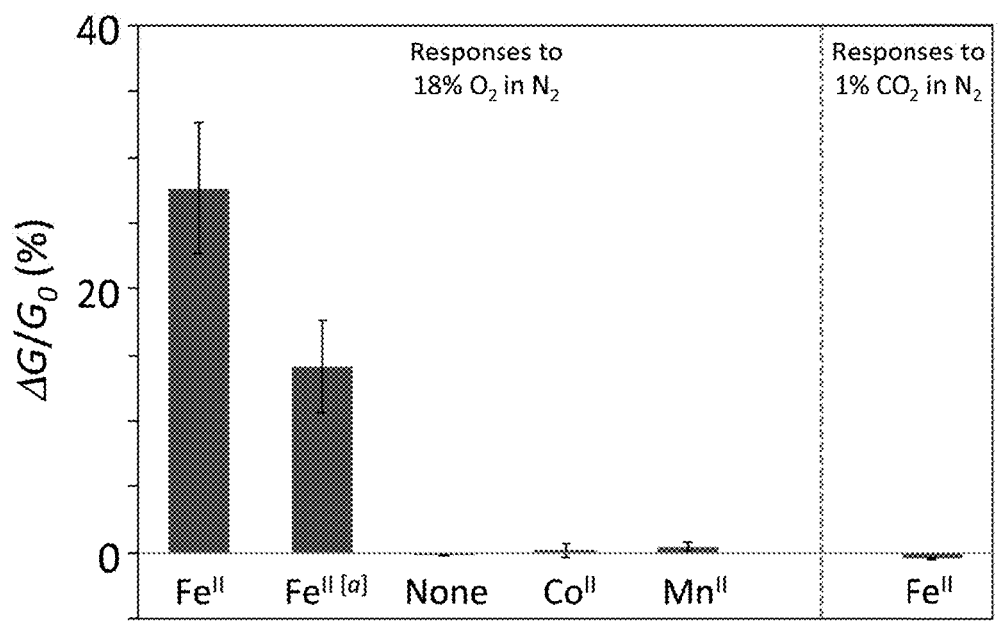
FIG. 4B shows average conductance change of (≥3) devices fabricated from varying metal species in response to 50 s $O_2$ or $CO_2$ exposure diluted in $N_2$. $Fe^{II}$: $Fe(MeCN)_6(BF_4)_2$; $Co^{II}$: $Co(MeCN)_6(BF_4)_2$; $Mn^{II}$: $Mn(MeCN)_4(BF_4)_2$. [a]The devices were fabricated under ambient atmosphere instead of nitrogen.

The presence of $Fe^{II}$ is essential for the response as a control sensor consisted of pristine P4VP-SWCNT afforded no response (FIG. 4B). Sensors fabricated from similar acetonitrile complexes derived from $Co^{II}$ or $Mn^{II}$ displayed minimal response, which was expected because these species are less prone to oxidation. See, Heintz, R. A.; Smith, J. A.; Szalay, P. S.; Weisgerber, A.; Dunbar, K. R. *Inorganic Syntheses* 2002, 33, 76, which is incorporated by reference in its entirety. The P4VP-SWCNT-$Fe^{II}$ chemiresistors was further tested for responses to carbon dioxide, which is a component of air (ca. 0.04% by volume) and is also generated from metabolic processes. It was found that the system displays only a minor response to an elevated concentration of carbon dioxide (1%) with the detection of a slight conductance decrease. To ensure a maximum response, the $Fe^{II}$-incorporation was performed under nitrogen atmosphere. However, this process can also be carried out at ambient conditions and without using degassed or anhydrous solvent, albeit at an expense of the ultimate response (FIG. 4B).

Next, an oxygen responsive chemiresistor was integrated into the circuit of an NFC tag for wireless sensing. This was accomplished using the recently developed protocol, which involves a single-step dropcasting deposition of the chemiresistive material to create a device referred to as a p-CARD (FIG. 2A). See, Zhu, R.; Azzarelli, J. M.; Swager, T. M. *Angew. Chem. Int. Ed.,* 2016, 55, 9662-9666, which is incorporated by reference in its entirety. The "p" signifies a parallel relationship between the chemiresistor ($R_s$) with respect to the integrated circuit. This scheme ensures a monotonic decrease in RF signal reflection across the NFC frequency band in response to decreasing $R_s$. This method also allows unambiguous determination of exposure and facile tuning for smartphone readability. Additionally, the linear RF gain response region for $R_s$ in this device is reasonable large (0.1 k$\Omega$~1 M$\Omega$). For comparison, strategies involving antenna modification require a $R_s$<1 k$\Omega$. See, Jun, J.; Oh, J.; Shin, D. H.; Kim, S. G.; Lee, J. S.; Kim, W. Jang, J. *ACS Appl. Mater. Interfaces* 2016, 8, 33139-33147, and Tanguy, N. R.; Fiddes, L. K.; Yan, N. *ACS Appl. Mater. Interfaces* 2015, 7, 11939-11947, each of which is incorporated by reference in its entirety. The p-CARD's working window encompasses the typical dynamic ranges of carbon nanotube-based chemiresistors, thereby making it a suitable platform. Finally, the simplicity of the p-CARD fabrication process is also highly desired from a practical perspective, as devices can be readily produced by printing functional SWCNTs on commercial passive NFC RFID tags.

Figure 5A:
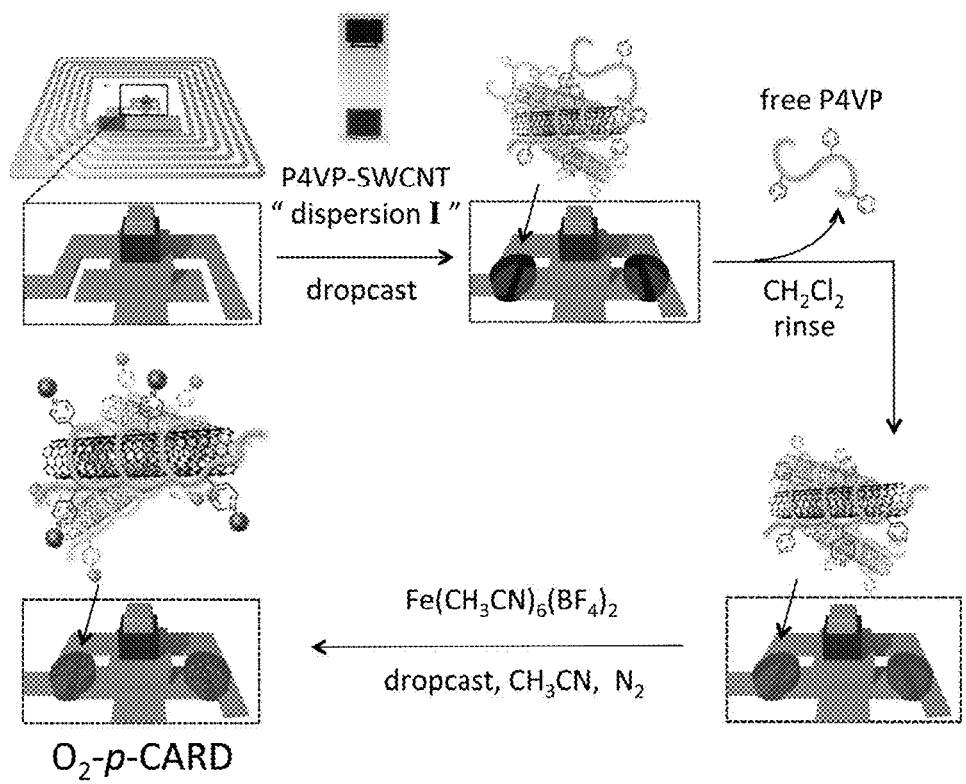
FIG. 5A shows schematic description of the fabrication of an $O_2$-p-CARD.
Figure 5B:
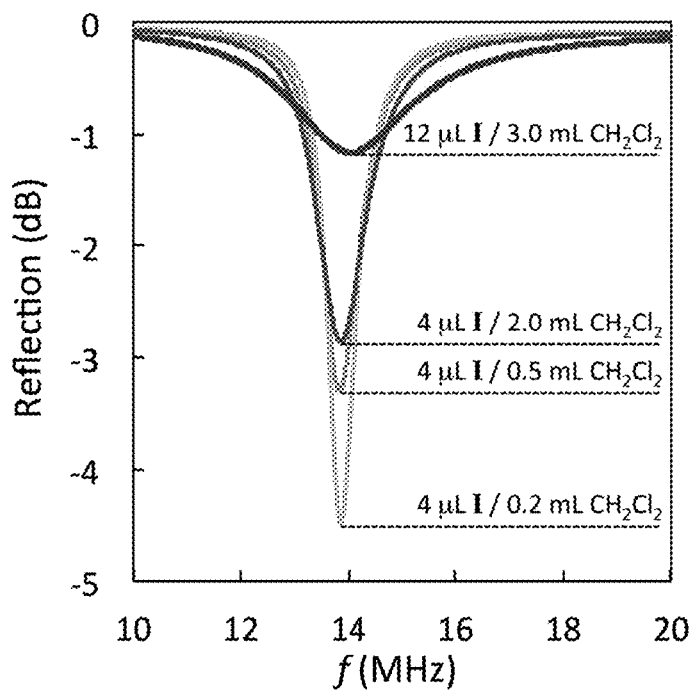
FIG. 5B shows reflection spectra (FIG. 19C) of $O_2$-p-CARDs fabricated with varying amount of P4VP-SWCNT dispersion I or the dichloromethane used for rinsing show tunable initial gains.

The device fabrication begins with dropcasting of a DMF P4VP-SWCNT dispersion, I, onto the indicated locations of an NFC tag (FIG. 5A). See, Yoon, B.; Liu, S. F.; Swager, T. M. *Chem. Mater.* 2016, 28, 5916-5924, which is incorporated by reference in its entirety. After vacuum removal of the solvent, the film showed negligible conductivity (>10 M$\Omega$), however the conductivity increased (<1 M$\Omega$) after dropwise rinsing with dichloromethane to remove the excess free P4VP. Visual inspection indicated that the bulk of the wrapped-SWCNT film remains intact. In the final step, a $Fe(MeCN)_6(BF_4)_2$ solution is deposited on top of the nanotube composite film under nitrogen atmosphere, to produce a functional $O_2$-p-CARD. The reflection signal magnitude of the device was described using S11-determined resonant frequency minimum gain value (in dB), which is referred to as "gain" here forward. The initial gain of the device can be easily tuned by varying the amount of either dispersion I deposited or the amount of dichloromethane used in rinsing away the excess P4VP (FIG. 5B).

Figure 6:
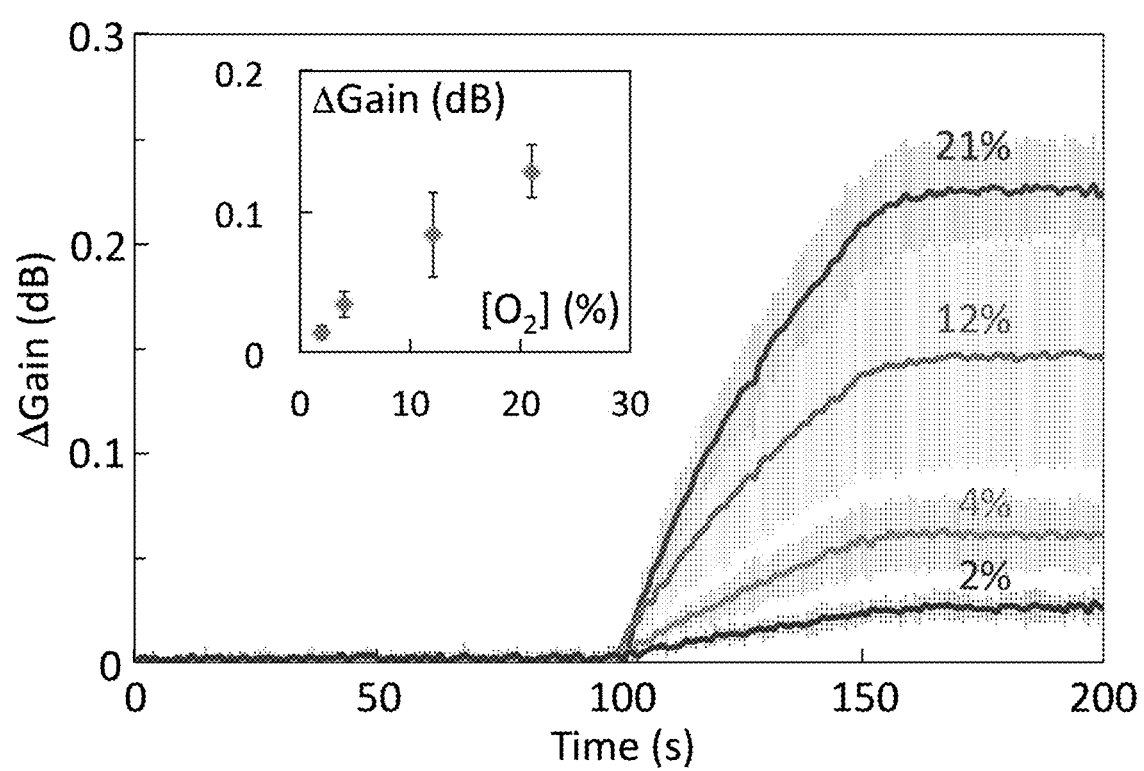
FIG. 6 shows $O_2$-p-CARD performance with varying $O_2$ concentrations diluted in $N_2$.

The responses of $O_2$-p-CARDs toward 50 s oxygen exposure of varying concentrations (2% to 21%) are summarized in FIG. 6. Irreversible increases in gain were observed (decreases in the reflection signal), which is consistent with decreasing $R_s$. Following a previously derived empirical formula (see Zhu, R.; Azzarelli, J. M.; Swager, T. M. *Angew. Chem. Int. Ed.,* 2016, 55, 9662-9666, which is incorporated by reference in its entirety) for p-CARDs, the response magnitude in $R_s$ is calculated ($\Delta G/G_0=34\pm3\%$ at 21% $O_2$) and was consistent with surface-immobilized sensors (28±5% at 18% $O_2$). For food preservation, $O_2$ content in a modified atmosphere package is typically maintained lower than 2%. The $O_2$-p-CARD has demonstrated a response to $O_2$ at this concentration. Additionally, it was shown that the relationship between the response and concentration remains reasonably linear throughout the concentrations studied (FIG. 6, inset). In FIG. 6, the devices were exposed to $O_2$ from 100 s to 150 s. Flow rate=2 L/min. The results were the averages of at least three individual devices. Shaded areas indicate standard deviations. Inset: Calibration curve based on responses after 25 s of $O_2$ exposure. This feature in combination with the irreversibility allows for the determination of the cumulative dose of $O_2$ exposure.

Figure 7:
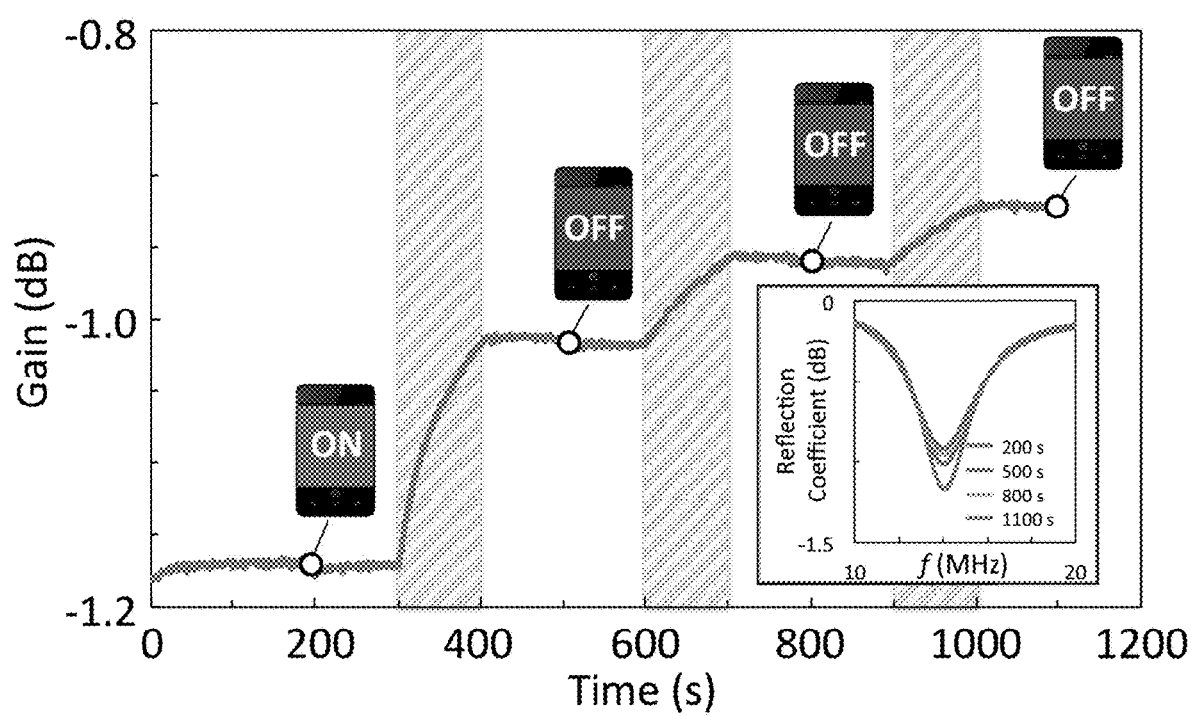
FIG. 7 shows an $O_2$-p-CARD's gain was monitored while it was iteratively exposed to 21% $O_2$ diluted in $N_2$.

$O_2$-p-CARD device gain was found to be transduced to produce a binary threshold sensor that is smartphone readable. In a typical experiment, an $O_2$-p-CARD with an initial gain of ~−1.2 dB was exposed to 21% $O_2$ for 50 s repeatedly. In FIG. 7, $O_2$-p-CARD's gain was monitored while it was iteratively exposed to 21% $O_2$ diluted in $N_2$ Flow rate=2 L/min. The shaded bars indicate oxygen exposures. The device was read by a smartphone at 200 s, 500 s, 800 s, and 1100 s (hollow circles). Inset: $O_2$-p-CARD reflection spectra (FIG. 19) at different times. Prior to the exposures, the device was readable by a smartphone (FIG. 7, "on") and its ID information could be retrieved. After one exposure cycle, the device gain increased to ~−1.0 dB. This decrease in signal reflection (FIG. 7, inset) switched the device to a smartphone unreadable state ("off"). The unreadable state was persistent in the absence of $O_2$, as a result of the irreversible nature of the response mechanism. As mentioned the initial gain of an $O_2$-p-CARD can be customized by deposition and rinsing, so that devices can be readily constructed that switch "off" to $O_2$ exposure levels demanded by a specific application.

Figure 8:
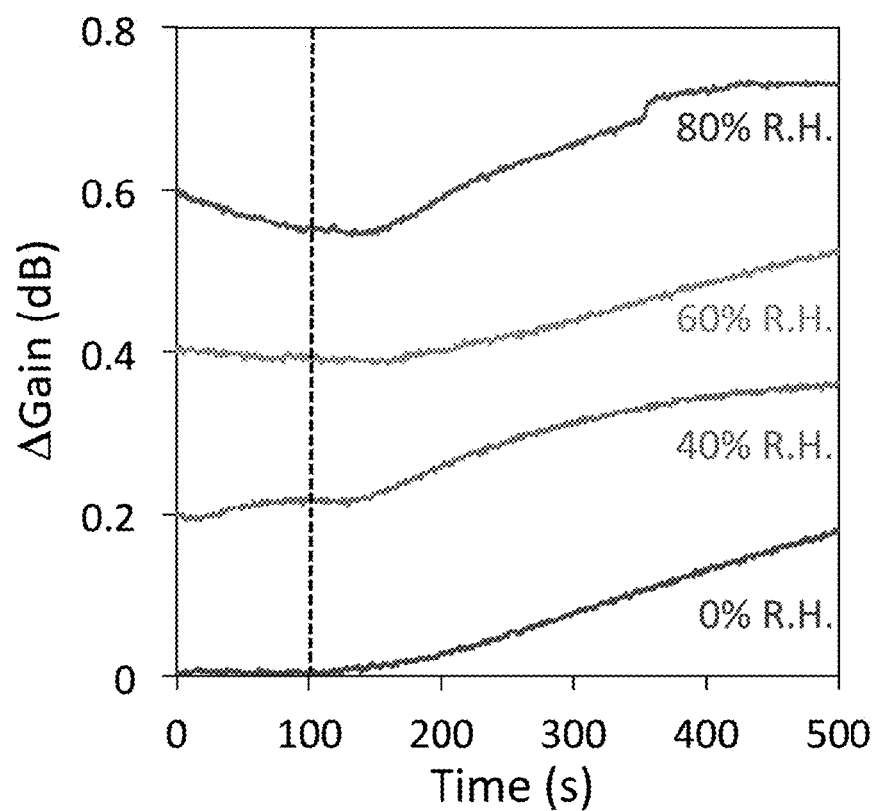
FIG. 8 shows halocarbon oil-modified $O_2$-p-CARD performance at varying humidity levels. Relative humidity was maintained constant (±5%) throughout the experiment.

Substantial humidity is present in many packages containing meat, fruits or vegetables. Therefore it is relevant to test the performance of $O_2$-p-CARDs at elevated humidity. However the original $O_2$-p-CARD failed to function properly at 60% R. H., as indicated by a drifting baseline and complicated response trace (FIG. 18B). To mitigate this problem, halocarbon oil was used as an oxygen-permeable moisture barrier on top of the P4VP-SWCNT-$Fe^{II}$ chemiresistor film. This halocarbon oil-modified $O_2$-p-CARD was found to produce a flat baseline and desired monotonic response toward oxygen exposures at 0~60% R. H. (FIG. 8). In FIG. 8, flow rate=0.5 L/min. 0-100 s: $N_2$; 100-500 s: 21% $O_2$ in $N_2$. At higher humidity (80% R. H.), a slight gain decreasing drifting in the baseline was observed, which partly offset the desired response to oxygen.

Figure 9A:
FIG. 9A-9B show $O_2$-p-CARD as a smart label implemented in an $N_2$-filled package containing vegetables.
Figure 9B:
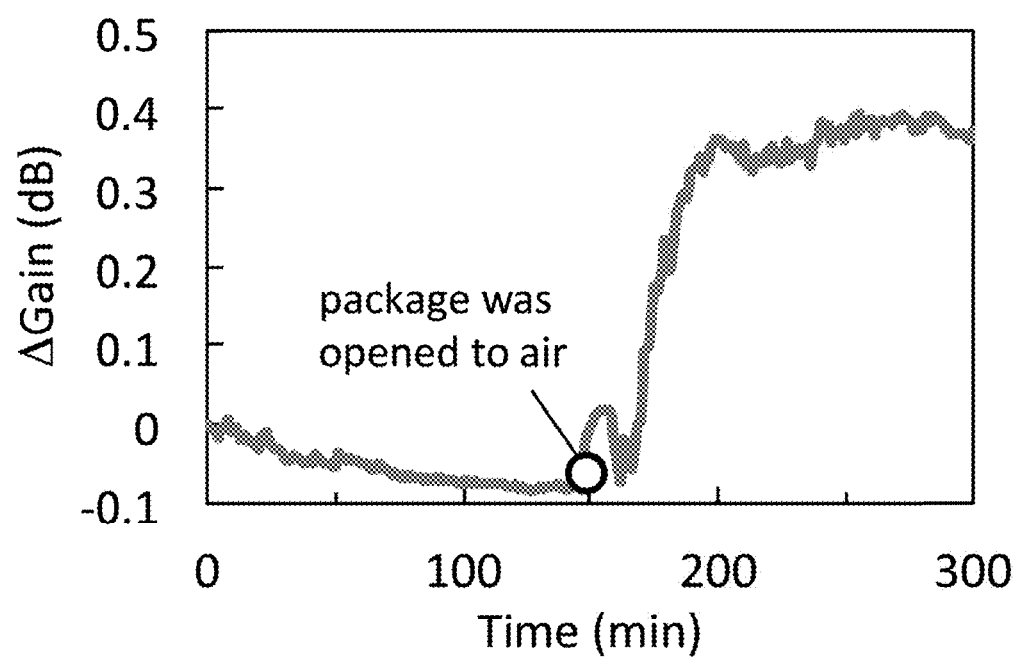

In a final demonstration, a device was implemented in an $N_2$-filled package to test its performance in a simulated real-world use case. To this end, a halocarbon oil-modified $O_2$-p-CARD was placed in a nitrogen-flushed ziplock polyethylene storage bag containing fresh vegetables and sealed (FIG. 9A). The device gain was continuously monitored and remained unchanged during the first 150 min, indicating minimal oxygen exposure (FIG. 9B). At t=150 min, the package was unzipped to open to air (~25% R. H.). After a short delay period, the device gain underwent a sharp increase followed by a steady saturated state, reflecting the air ingress that could have compromised the content quality. Similar experiments were conducted for monitoring green tea packaging as detailed in the supporting information (Section 4). Green tea is known to be air sensitive and the low humidity in this case allowed for the monitoring with tags that did not require a moisture barrier coating.

In conclusion, a chemiresistor that displays a dosimetric response to oxygen has been developed based on a $Fe^{II}$-P4VP-SWCNT composite. A~30% increase in the conductance of this chemiresistor was observed with a 50 s exposure to 18% $O_2$. This chemiresistor was incorporated into an NFC resonant RF circuit via simple dropcasting and produced a wireless oxygen sensor, $O_2$-p-CARD. It was shown that the reflection signal of an $O_2$-p-CARD decreased irreversibly in response to oxygen at concentrations that are relevant for modified atmosphere packaging. A binary (on-→off) smartphone detection can be set to trigger at different cumulative oxygen exposures by adjusting the formulation and amount of material applied to the tag. An $O_2$-p-CARD can be inserted in a nitrogen-filled vegetable package for monitoring air ingress at ambient conditions. The $O_2$-p-CARD provides an inexpensive, heavy-metal-free and smartphone-addressable alternative for in situ non-line-of-sight quality monitoring of oxygen-sensitive content in a modified atmosphere package. These devices can be readily integrated into current RFID systems for the tracking and quality monitoring of food and pharmaceuticals.

Examples

General Materials.

All chemicals and reagent were purchased from Sigma-Aldrich and used without additional purification, unless otherwise noted. 3-Bromopropyltrichlorosilane was purchased from Oakwood and used as is. $Fe(MeCN)_6(BF_4)_2$, $Co(MeCN)_6(BF_4)_2$ and $Mn(MeCN)_4(BF_4)_2$ were synthesized according to previous reported method.[12] Acetonitrile was dried and distilled from calcium hydride under argon and stored with 4 Å molecular sieves in a nitrogen glove box. Single-walled carbon nanotubes (0.7 to 1.3 nm diameter) were purchased from Sigma-Aldrich (Lot # MKBP3333V). P4VP-SWCNT (P4VP: 50 mg, SWCNT: 5.0 mg) dispersion in N, N-dimethylformamide (DMF, 10 mL) was prepared following previously described method.[10] This dispersion is referred to as 'dispersion I' throughout the following text. This study uses commercially available Texas Instruments HF-I Tag-It Plus Transponder Inlays (TI-Tag).

Characterization.

UV-Vis-NIR absorption spectra were obtained using an Agilent Cary 5000 spectrophotometer. ATR-FTIR spectra were obtained using a Thermo Scientific Nicolet 6700 FTIR with a Ge crystal for ATR. Raman spectra were collected with excitation at 633 nm laser using a Horiba LabRAM HR800 Raman spectrometer. X-ray photoelectron spectroscopy (XPS) was performed with a PHI Versaprobe II XPS spectrometer. Scanning electron microscope (SEM) images were obtained using a JEOL JSM-6700F FESEM at an accelerating voltage of 3 and 10 kV.

Surface-Immobilized Sensors on Glass Substrates

Following literature procedures, a P4VP-SWCNT chemiresistor platform immobilized on a glass substrate was prepared from dispersion I using 3-bromopropyltrichlorosilane as the surface anchoring agent. See, Yoon, B.; Liu, S. F.; Swager, T. M. Chem. Mater. 2016, 28, 5916-5924, which is incorporated by reference in its entirety.

General Procedure A: Fabrication of Surface Immobilized Oxygen Sensors.

A P4VP-SWCNT chemiresistor device immobilized on a glass substrate was transferred into a nitrogen-filled glovebox. The device was soaked in a solution of $Fe(MeCN)_6(BF_4)_2$ (5 mg/mL in acetonitrile) for 4 h followed by drying under vacuum overnight.

Other metal ion composites were produced following General Procedure A with slight modifications. Surface-immobilized P4VP-SWCNT-$Co^{II}$, P4VP-SWCNT-$Mn^{II}$, and metal-free P4VP-SWCNT sensors were fabricated from $Co(MeCN)_6(BF_4)_2$, $Mn(MeCN)_4(BF_4)_2$ (5 mg/mL in acetonitrile), respectively.

Wireless Sensor ($O_2$-p-CARD)

General Procedure B: Fabrication of $O_2$-p-CARD (FIG. 5A).

Figure 16A:
FIG. 16A shows a photo of an $O_2$-p-CARD showing the dropcasted P4VP-SWCNT-$Fe^{II}$ composite.
Figure 16B:
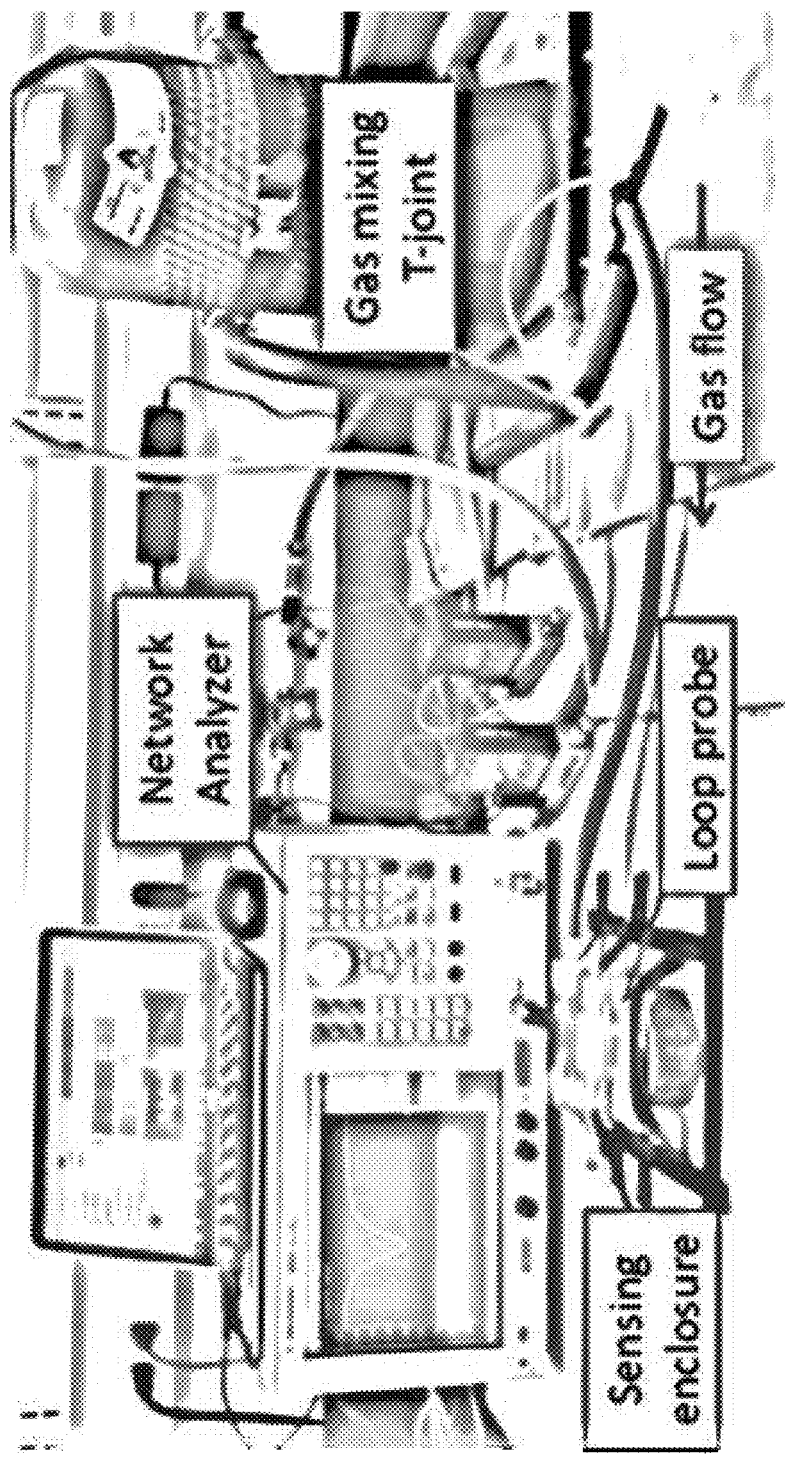
FIG. 16B shows typical experimental setup for wireless oxygen sensing.
Figure 17:
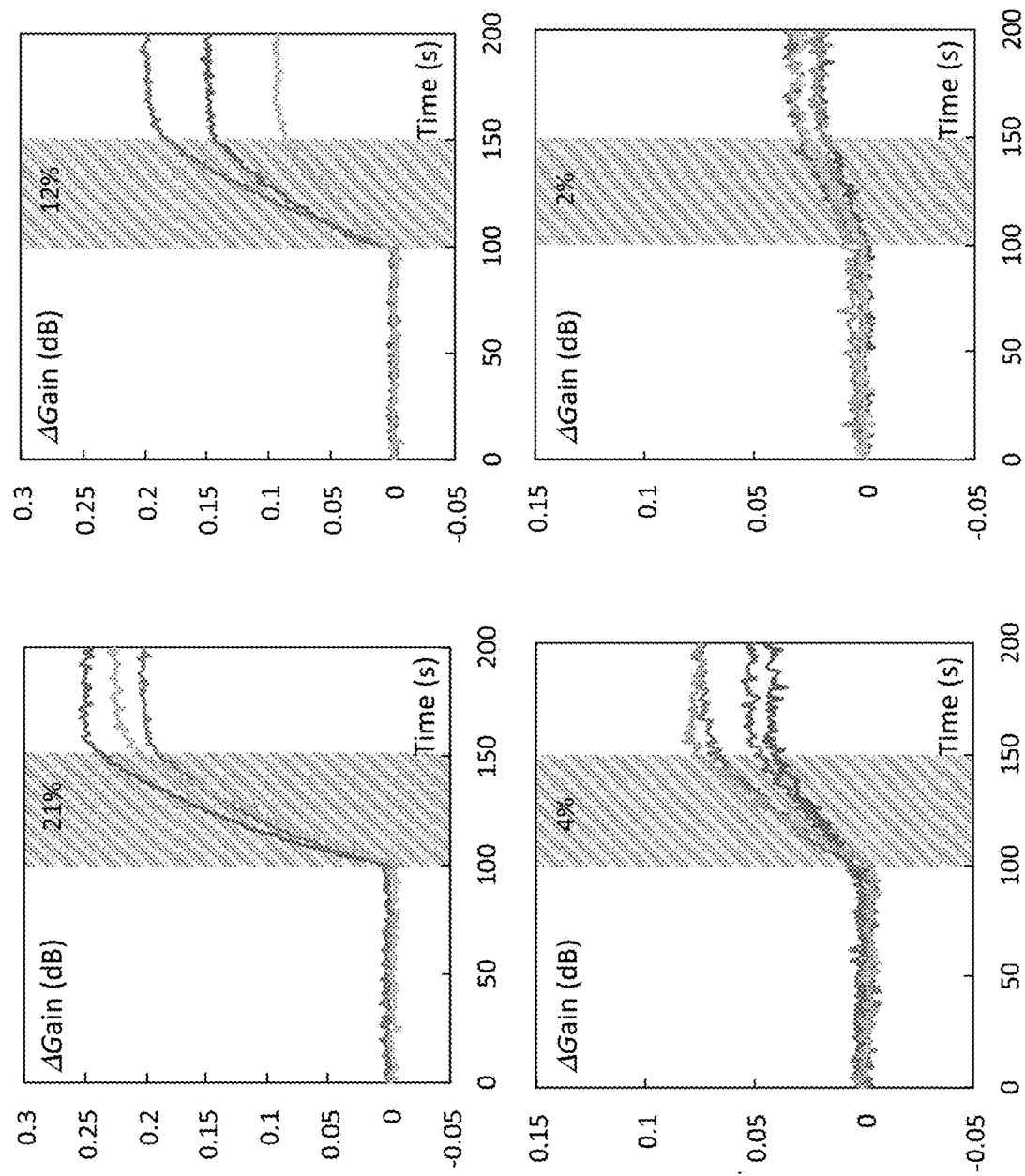
FIG. 17 shows wireless sensing traces of $O_2$-p-CARDs in response to 50 s $O_2$ exposure of varying concentrations indicated therein (shaded areas).

A dispersion I (2 µL) was dropcast at the locations indicated in FIG. 2, followed immediately by subjecting the device to a high vacuum environment in a desiccator for 10 minutes. This sequence was repeated so that 4 µL dispersion I was deposited in total. The resulting P4VP-SWCNT thin film obtained was washed with 0.2 mL dichloromethane dropwise to remove excess P4VP and air-dried. The device was transferred into a nitrogen-filled glovebox. Under nitrogen atmosphere, 20 µL $Fe(MeCN)_6.(BF_4)_2$ solution (5 mg/mL in acetonitrile) was dropcast on top of the P4VP-SWCNT thin film. The device was allowed to sit for 15 min before subjecting it to high vacuum for 30 min in the vacuum chamber. This device was then inserted into a plastic sensing enclosure, which was sealed with electrical tape and taken out from the glovebox. The enclosure was immediately purged with 1 L/min $N_2$ for 10 min before used for oxygen sensing. The gas flow delivery system used for wireless sensing was identical to that described in the previous section (FIGS. 16A-16B).

Device RF Response Characterization:

The RF signal response of $O_2$-p-CARDs was monitored from 10-20 MHz with a custom-made loop probe connected via a BNC cable to a vector network analyzer (VNA) (Agilent E5061B) by measuring reflection coefficient (FIG. 19C) at 50Ω port impedance and 0 dBm input power. The distance between the probe and the device in the sensing enclosure was fixed throughout an experiment (typically in the range of 0.5~1 cm). The S11-determined resonant frequency ($f_0$) minimum gain value (noted as "Gain" in short, in dB) was measured and acquired using a custom-built LabView program that executed a minimum-search algorithm at specified time intervals and tabulated the data into an exportable file.

Demonstration of Smartphone Readability Switch.

An $O_2$-p-CARD was fabricated following General Procedure B with slight modifications. A total amount of 12 µL of dispersion I was deposited, instead of 4 µL; and 3 mL dichloromethane was used to wash off the excess P4VP. Such that the initial gain was around −1.2 dB (close to the readability cut-off) and the readability switch could be observed within a few exposure cycles. The Samsung Galaxy™ S4 (SGS4) was used to demonstrate the device readability switch upon oxygen exposure. The 'NFC Reader' (Adam Nybäck; 5 Jul. 2013) was used to read the tags. For the purposes of this study, the tag is considered "on" or "readable" if the unique identification number can be retrieved within 5 seconds or less of holding the smartphone at ~2.5 cm distance away from the tag. Conversely, the tag is considered "off" or "unreadable" if the unique identification number cannot be retrieved under the same conditions.

Device Modification for Oxygen Detection at Elevated Humidity.

Following General Procedure B, an $O_2$-p-CARD was fabricated. Halocarbon oil 700 (Sigma # H8898, ~4 mg) was dropcast on top of the P4VP-SWCNT-$Fe^{II}$ film to completely cover the area, affording a modified $O_2$-p-CARD.

A humid mixed gas flow was generated by actively bubbling through water and used for sensing experiments (FIG. 18A). A digital house humidity sensor (Extech® 445715) was connected to the outlet of the gas flow system for monitoring. The relative humidity of the gas flow could be adjusted between 40% and 80% by varying the amount of water in the bubbler and kept constant (±5%) throughout an individual sensing experiment.

Detection of Air Ingress in a Compromised Package Setting.

An $O_2$-p-CARD was fabricated following General Procedure B with modifications: A total amount of 12 µL of dispersion I was deposited, instead of 4 µL; and 3 mL dichloromethane was used to wash off the excess P4VP. Halocarbon oil 700 (~4 mg) was dropcast on top of the P4VP-SWCNT-$Fe^{II}$ film to completely cover the area, affording a modified $O_2$-p-CARD.

Under nitrogen gas purging (3 L/min), this device was inserted into a 17.7 cm×19.5 cm polyethylene re-sealable zipper storage bag containing vegetables. The bag was further purged with $N_2$ for 5 min before re-sealed. The bag was placed on the probe of VNA with the $O_2$-p-CARD facing down. The device gain was monitored over time. At t=150 min, the bag was fully unzipped to open to air (25% R. H.).

Oxygen Sensing Measurement.

Figure 12A:
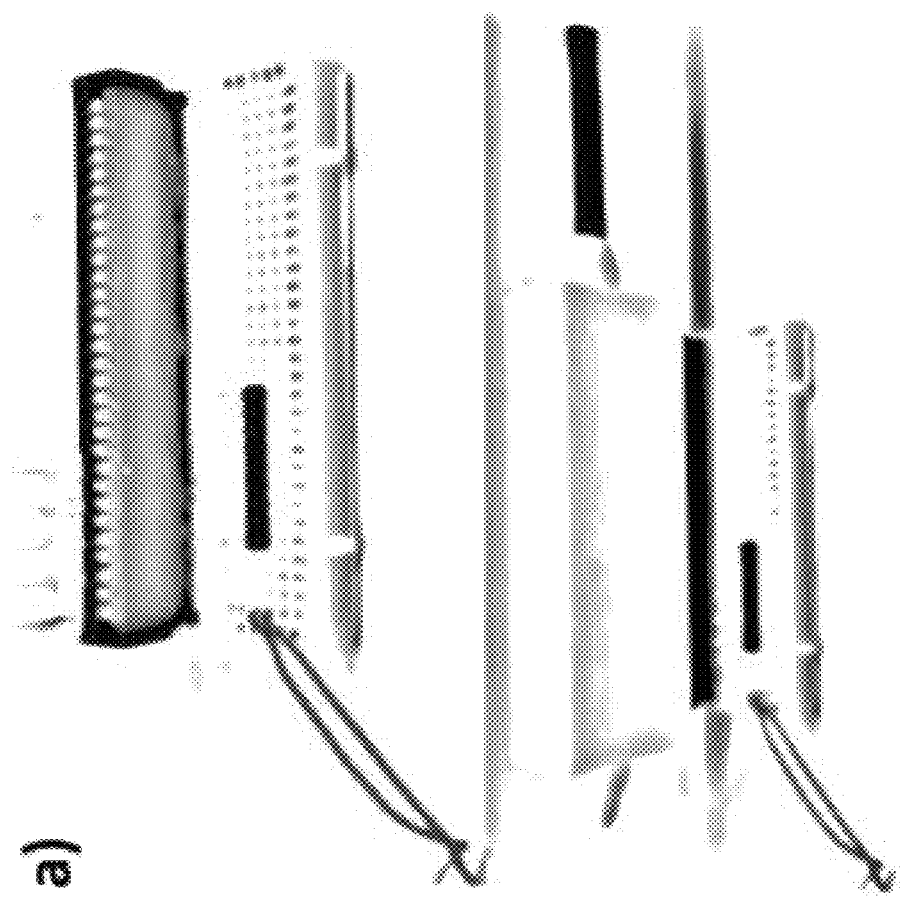
FIG. 12A shows a photograph of a set of quadruplicate surface-anchored P4VP-SWCNT-$Fe^{II}$ sensors were inserted in the sensing enclosure.
Figure 12B:
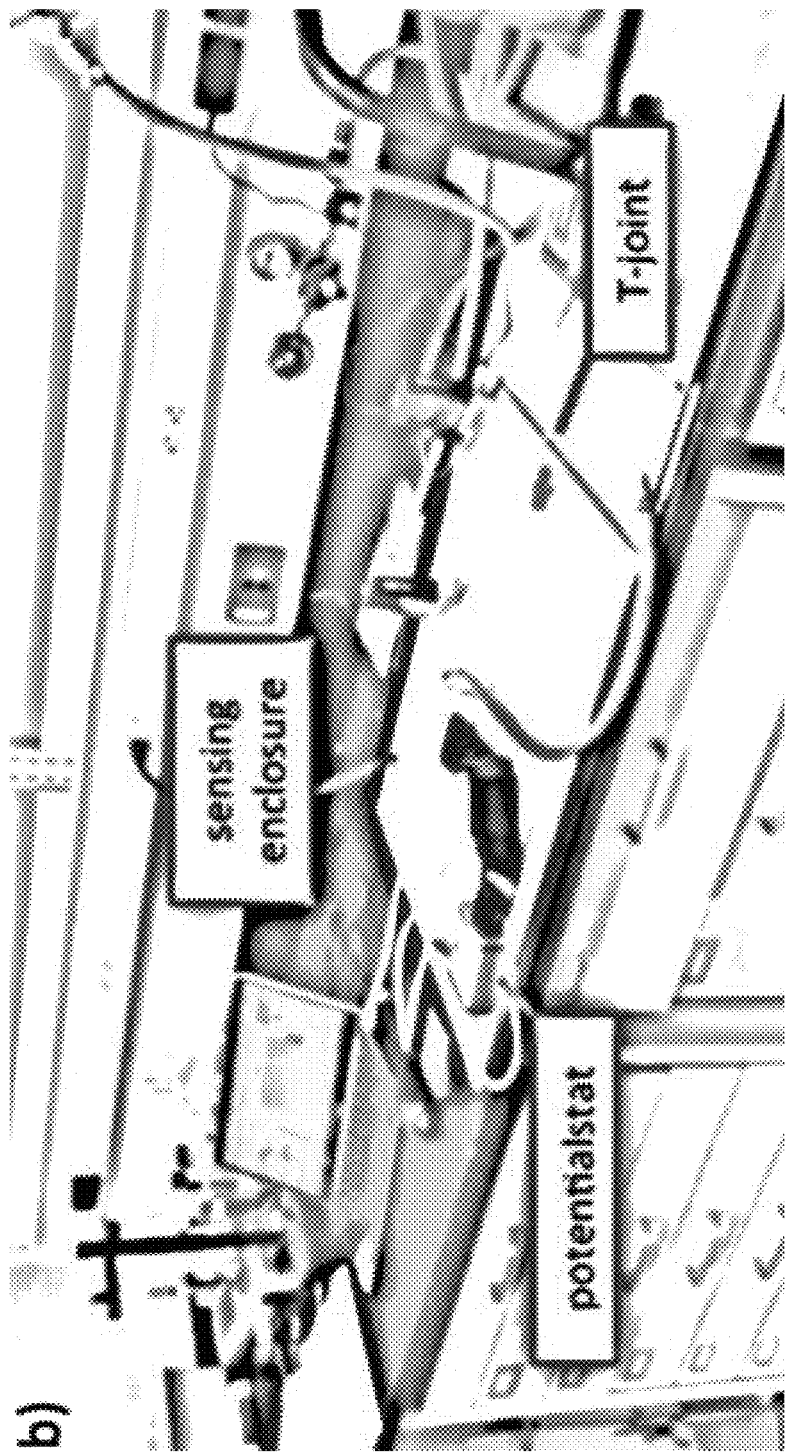
FIG. 12B shows a photograph of a typical chemiresistive sensing experimental setup.
Figure 13A:
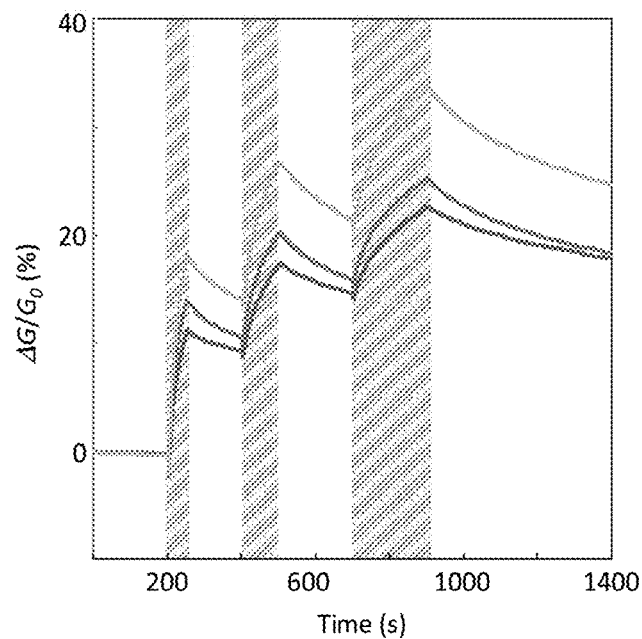
FIGS. 13A-13C show chemiresistive traces of functionalized surface-anchored P4VP-SWCNT composites in response to $O_2$ exposures in $N_2$. Shaded areas: 18% $O_2$ in $N_2$ (v/v). Flow rate=2 L/min.
Figure 13B:
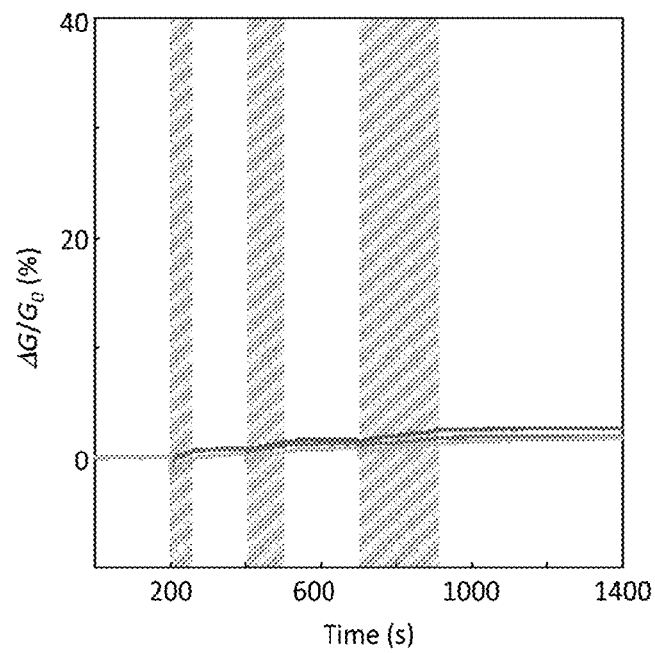
Figure 13C:
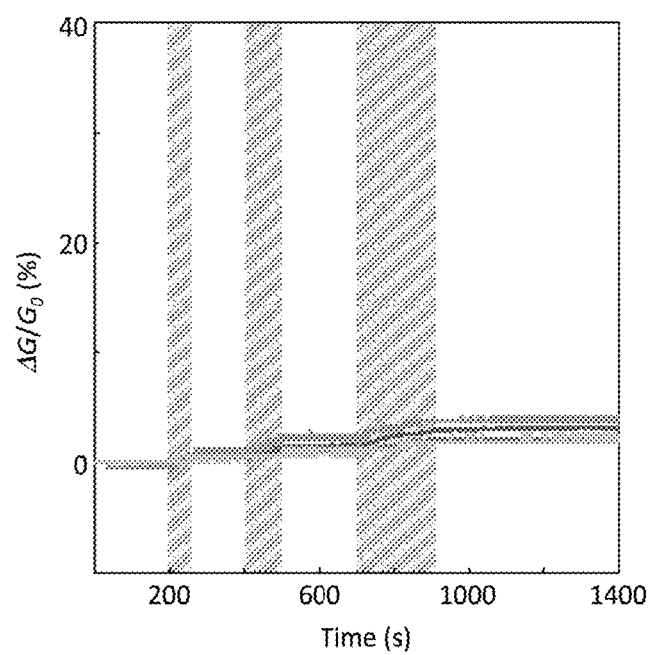
Figure 14A:
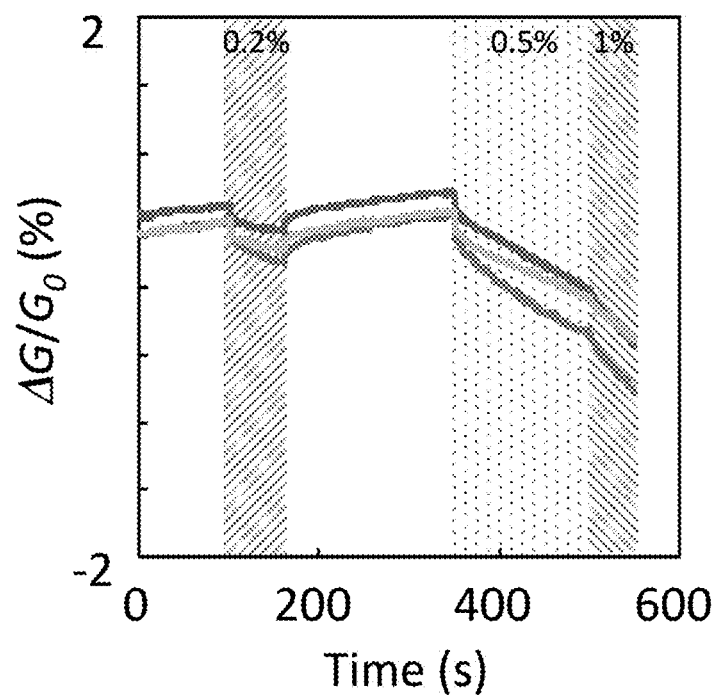
FIGS. 14A-14B show Chemiresistive traces of triplicate surface-anchored SWCNT-P4VP-$Fe^{II}$ composite devices in response to $CO_2$ exposures (indicated by shaded areas).
Figure 14B:
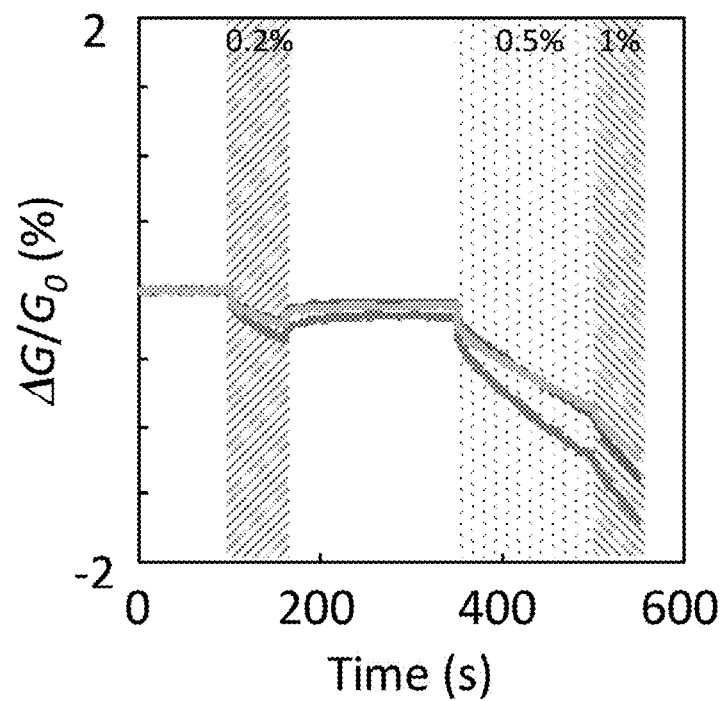
Figure 15:
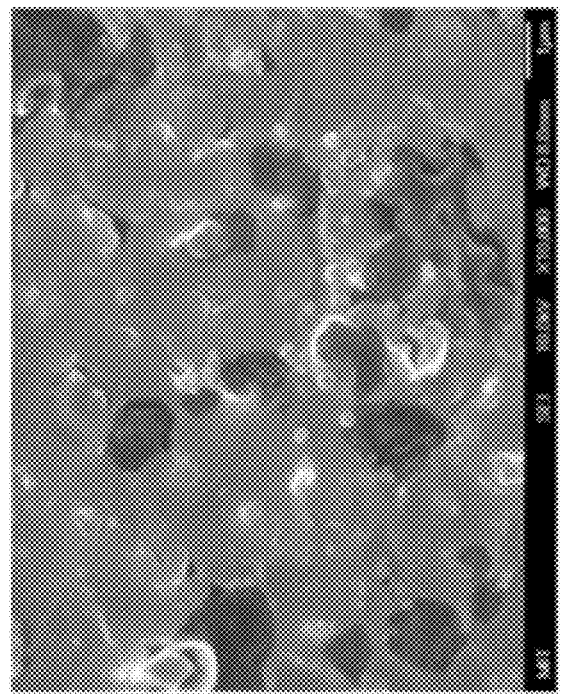
FIG. 15 shows scanning electron microscopy images of the chemiresistor film of a device before and after dropcasting $Fe(MeCN)_6(BF_4)_2$ solution.
Figure 15:
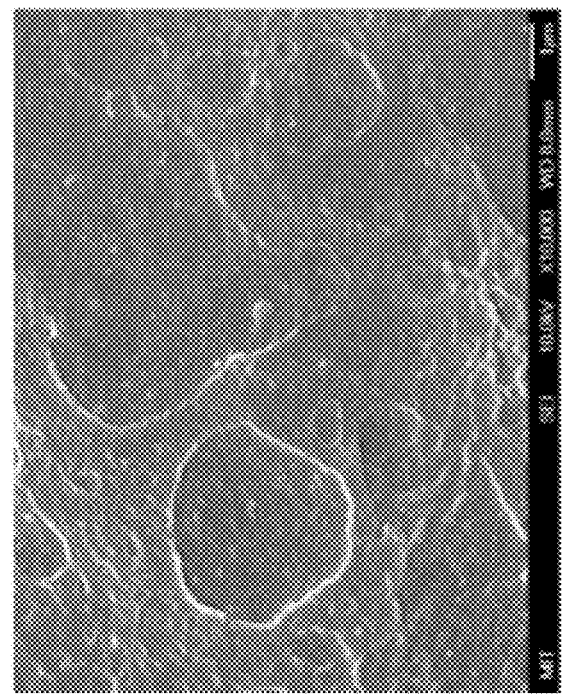

In a nitrogen-filled glovebox, the fabricated sensor device was inserted into a 2×30 pin edge connector (TE Connectivity AMP Connectors) mounted on a solderless breadboard, and then enclosed with a custom-built PTFE chamber containing a small gas inlet and outlet (FIG. 12A). This sensing enclosure was sealed with clay and removed from the glovebox. The enclosure was purged for 1 h with 1 L/min $N_2$ before used for sensing experiment. Two MC Standard Series mass flow controllers (model MC-10SLPM-D/5M Alicat Scientific, Tucson, Ariz.) were used to deliver $O_2$ and $N_2$ at indicated flow rates respectively. The gases were mixed at a T-shaped joint and delivered to the sensing enclosure (FIG. 12B). The gold electrodes of the device were connected to a PalmSens EmStat potentiostat with a MUX16 multiplexer. The potentiostat applied a constant potential of 0.1 V across the electrodes, and the current for each channel of the device was recorded using PSTrace software (v. 4.7). The change in current resulting from exposure to $O_2$ was converted to the change in conductance ($\Delta G/G_0$ (%)=$(I_0-I)/I_0 \times 100\%$, where $I_0$ is initial current), which was taken as the device's response. $CO_2$ sensing experiments were performed following the same procedure described using $CO_2$ instead of $O_2$.

Monitoring Air Ingress in a Compromised Tea Package

Figure 19A:
FIGS. 19A-19C show $O_2$-p-CARD as a smart label implemented in an $N_2$-filled package containing Chinese loose-leaf tea.
Figure 19B:
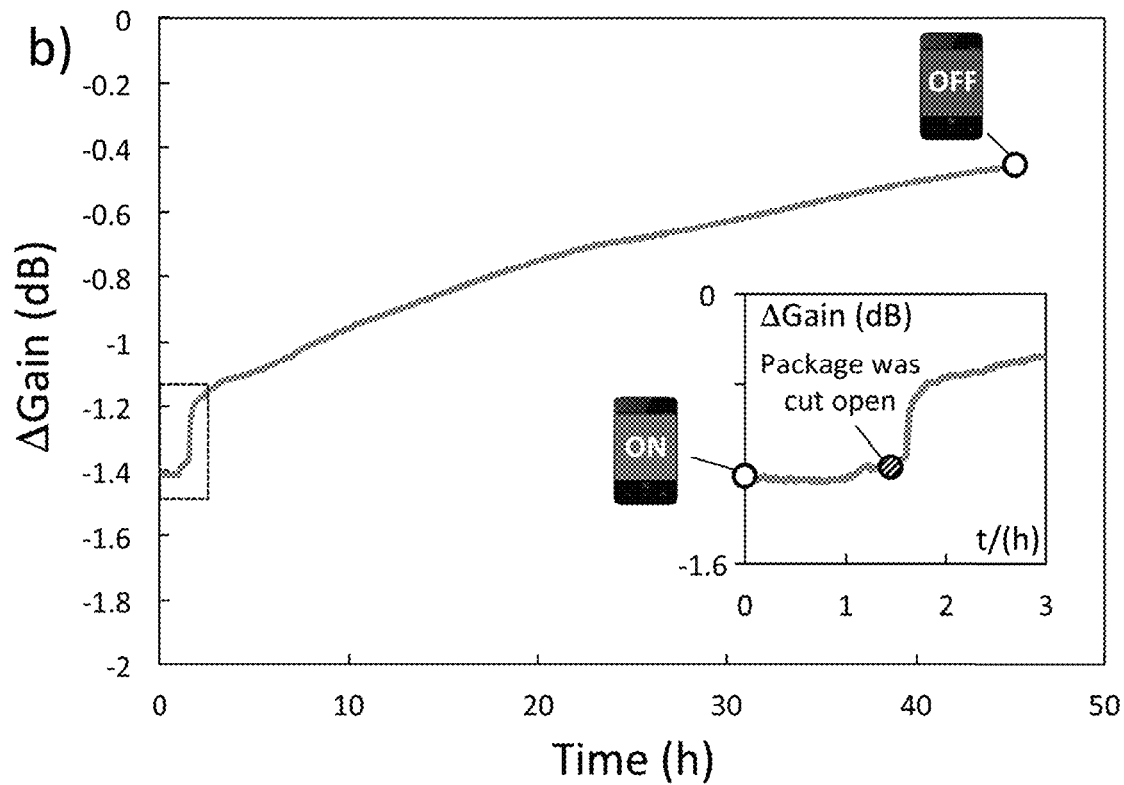
Figure 19C:
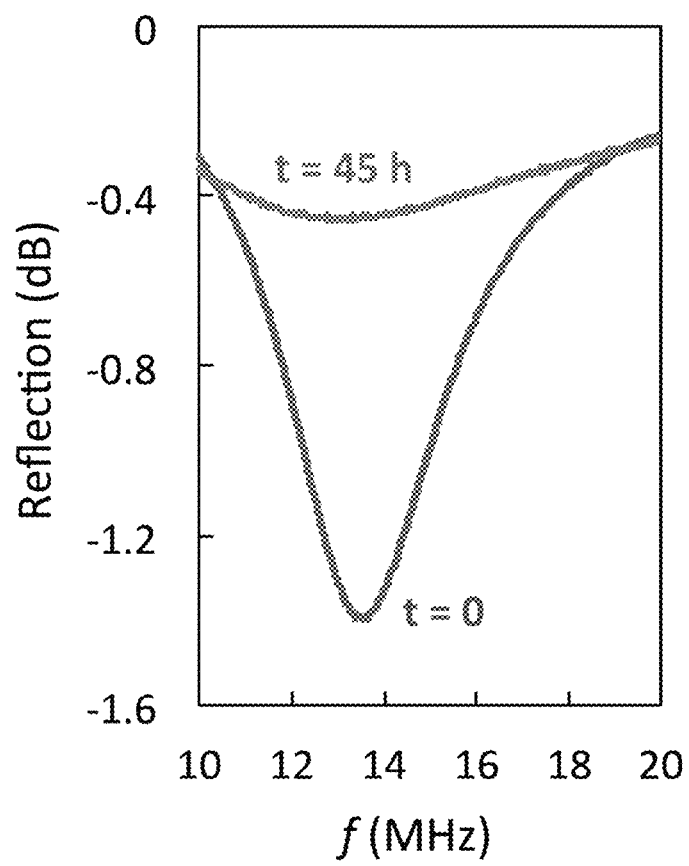

An additional example shows an original $O_2$-p-CARD functioned properly for ambient air ingress monitoring in a low humidity package of green tea (FIGS. 19A-19C). Green tea is susceptible to deterioration by aerobic oxidation as a result of its rich polyphenol content and it is generally stored under nitrogen atmosphere. See, Huang, Y.; Xu, J.; Hu, Q. *J. Agric. Food Chem.* 2005, 53, 7444-7447, which is incorporated by reference in its entirety. Additionally, tea leaves tend to absorb molecules from their surroundings so the integrity of the sealed package is crucial for preserving their flavor.

To this, an $O_2$-p-CARD was fabricated following General Procedure B with slight modifications: A total amount of 12 µL of P4VP-SWCNT dispersion I was deposited, instead of 4 µL; and 3 mL dichloromethane was used to wash off the excess P4VP. Under nitrogen atmosphere, this device was placed on the back of a tea bag, which was inserted into a 15 cm×15 cm polyethylene re-sealable zipper storage bag. The bag was sealed and taken out from the glovebox and further purged with 3 L/min $N_2$ for 5 min before re-sealed with additional electrical tape (FIG. 19A).

The bag was placed on the probe of VNA with the $O_2$-p-CARD facing down. The device gain was monitored over time. At t=0 the device had sufficient resonant power transmission in the initial reflection spectra (FIG. 19C, blue plot) to response in an "on" state as determined by a smartphone reader, indicating a "good quality" product. The device gain was continuously monitored and remained unchanged (~−1.4 dB) during the first 1.5 h, indicating minimal oxygen exposure (FIG. 19B). At t=1.5 h, the package was cut to introduce a ~1 cm diameter hole open to air (~26% relative humidity) (FIG. 19B, inset). After a short delay period, the device gain underwent a sharp increase within 0.1 h, followed by a progressive increase with a decreasing rate until it reached saturation (~−0.4 dB) in 40 h. At t=45 h, the device was tested again and found to be unreadable by the smartphone, with a significantly attenuation in the resonant reflection (FIG. 19C, red plot). The final "off" state signals that the green tea was "exposed to air, and possibly has compromised quality".

Other embodiments are within the scope of the following claims.

What is claimed is:

1. A tag for detecting an analyte comprising:
    a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte,
    wherein the sensor portion includes a conductive material associated with a polymer complex including a polymer and a metal ion having a redox status, and detection of an analyte is via a change of in the redox status of the metal ion when contacted with the analyte.

2. The tag of claim 1, wherein the conductive material includes a carbon nanotube.

3. The tag of claim 1, wherein the polymer includes pyridine moieties.

4. The tag of claim 3, wherein the polymer includes poly(4-vinylpyridine) (P4VP).

5. The tag of claim 1, wherein the polymer binds a metal ion.

6. The tag of claim 1, wherein the metal ion is reduced upon interaction with the analyte.

7. The tag of claim 1, wherein the metal ion is oxidized upon interaction with the analyte.

8. The tag of claim 1, wherein the metal ion is $Cu^{2+}$, $Cu^+$, $Co^{3+}$, $Co^{2+}$, $Mn^{2+}$, $Pd^{2+}$, $Ru^+$, $Rh^{3+}$, $Ag^+$, $Cd^{2+}$, $Fe^{2+}$, $Ru^{3+}$, $Os^+$, $Ir^{3+}$, $Pt^{4+}$, $Pt^{2+}$, $Au^{3+}$, $Au^+$, $Hg^{2+}$, $Hg^+$ or $Tl^+$.

9. The tag of claim 1, wherein the metal ion is $Fe^{2+}$.

10. The tag of claim 2, wherein the carbon nanotube includes a single-walled carbon nanotube.

11. The tag of claim 1, wherein the conductive material includes graphene.

12. The tag of claim 1, wherein the conductive material includes metal oxides.

13. The tag of claim 1, wherein the conductive material includes a metal-organic-framework.

14. The tag of claim 1, wherein the analyte is oxygen.

15. The tag of claim 1, wherein each of the plurality of the carbon nanotubes are wrapped by the polymer.

16. The tag of claim 1, where the radio frequency identification tag is a near-field communication tag.

17. The tag of claim 1, wherein the tag is incorporated into a badge capable of being worn by a person.

18. A system for detecting an analyte comprising:
    a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte,
    wherein the sensor portion includes a conductive material associated with a polymer complex including a polymer and a metal ion having a redox status, and detection of an analyte is via a change of in the redox status of the metal ion when contacted with the analyte; and
    a detector.

19. The system of claim 18, wherein the system includes a dosimeter.

20. The system of claim 19, wherein the dosimeter is a radiation dosimeter, a chemical warfare agent dosimeter, a volatile organic compound dosimeter, or an analyte dosimeter.

21. The system of claim 18, wherein the system monitors a pollutant, a chemical relevant to occupational safety, a nerve agent, or a pulmonary agent.

22. The system of claim 18, wherein the system includes a plurality of tags.

23. The system of claim 22, wherein each of the plurality of tags is capable of detecting at least one analyte.

24. A method of detecting an analyte comprising:
    detecting an output from a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte,
    wherein the sensor portion includes a conductive material associated with a polymer complex including a polymer and a metal ion having a redox status, and detection of an analyte is via a change of in the redox status of the metal ion when contacted with the analyte.

25. The method of claim 24, further comprising detecting the output of the radio frequency identification by a reader.

26. The method of claim 25, wherein the reader includes a hand-held, mobile platform, or stationary reader.

27. The method of claim 25, wherein the reader includes a smartphone.

28. The method of claim 24, wherein the output is detectable by a reader after the output is shifted by detection of the analyte.

29. The method of claim 24, wherein the output is detectable by a reader after the output going through a physical object.

30. The method of claim 24, wherein the analyte contacts or interacts with a portion of the surface of the radio frequency identification tag.

31. The method of claim 24, wherein the sensor portion is located on a portion of a surface of the radio frequency identification tag.

32. The method of claim 24, wherein the sensor portion is surrounded by an antenna coil.

33. The method of claim 24, wherein the sensor portion has a surface area less than the surface area of the radio frequency identification tag.

34. The method of claim 24, wherein the radio frequency identification tag does not require a power source.

35. The method of claim 24, further comprising altering an electrical connection within the radio frequency identification tag.

36. The method of claim 24, wherein the sensor portion includes multiple sensing locations.

* * * * *